(12) United States Patent
Parisien et al.

(10) Patent No.: US 10,875,794 B1
(45) Date of Patent: Dec. 29, 2020

(54) METHOD OF CHANGING A PROPERTY OF A POLAR LIQUID

(71) Applicants: Brian Rudy Parisien, Dunrobin (CA); Neil Teitelbaum, Ottawa (CA); David Tat Fai Fung, Vancouver (CA); Ron Vered, Ottawa (CA); James Stuart Wight, Ottawa (CA)

(72) Inventors: Brian Rudy Parisien, Dunrobin (CA); Neil Teitelbaum, Ottawa (CA); David Tat Fai Fung, Vancouver (CA); Ron Vered, Ottawa (CA); James Stuart Wight, Ottawa (CA)

(*) Notice: Subject to any disclaimer, the term of this patent is extended or adjusted under 35 U.S.C. 154(b) by 0 days.

(21) Appl. No.: 16/901,854

(22) Filed: Jun. 15, 2020

Related U.S. Application Data

(63) Continuation-in-part of application No. 16/669,793, filed on Oct. 31, 2019, now Pat. No. 10,763,021.

(51) Int. Cl.
    *C02F 1/48* (2006.01)
    *B01J 19/08* (2006.01)
    *C02F 101/16* (2006.01)

(52) U.S. Cl.
    CPC ............. *C02F 1/487* (2013.01); *B01J 19/087* (2013.01); *C02F 2101/16* (2013.01); *C02F 2201/483* (2013.01)

(58) Field of Classification Search
    CPC .. C02F 1/48; C02F 1/487; B01J 9/087; H01F 7/06; H01F 7/064; H01F 7/20
    USPC ...................................................... 23/293 R
    See application file for complete search history.

(56) References Cited

U.S. PATENT DOCUMENTS

| 5,606,723 | A | 2/1997 | Morse et al. | 422/186 |
| 9,682,358 | B2 | 6/2017 | Rubio | |
| 2007/0221577 | A1 | 9/2007 | Vallee | 210/695 |
| 2009/0242407 | A1 | 10/2009 | Shiga | 204/557 |
| 2010/0181261 | A1 | 7/2010 | Taylor | 210/748.17 |
| 2010/0197992 | A1 | 8/2010 | Cuppen | 600/13 |
| 2014/0113331 | A1 | 4/2014 | Yancey, Jr. | 435/71.1 |
| 2014/0374236 | A1 | 12/2014 | Moore et al. | 204/155 |
| 2018/0216246 | A1 | 8/2018 | Chew et al. | 11/22 |
| 2018/0222778 | A1 | 8/2018 | Chew et al. | |

FOREIGN PATENT DOCUMENTS

| CN | 107352628 | 11/2017 | |
| JP | 2005296796 | 10/2005 | C02F 1/48 |
| WO | 9622831 | 8/1996 | B01J 19/08 |
| WO | 9622832 | 8/1996 | B01J 23/62 |
| WO | 2016115405 | 7/2016 | |

OTHER PUBLICATIONS

AU 202000509 Examination Report dated Mar. 18, 2020.

*Primary Examiner* — Edward M Johnson

(74) *Attorney, Agent, or Firm* — Teitelbaum & Bouevitch; Neil Teitelbaum

(57) ABSTRACT

For changing a property of a polar liquid a device comprising a signal generator and a transducer is provided adjacent to the liquid or at least partially immersed therein. The signal generator provides an alternating electrical signal to the transducer, wherein the electrical signal is of a frequency and an amplitude to affect the transducer to produce an alternating magnetic field having a magnetic flux density so as to change the property of the polar liquid, wherein a portion of the magnetic field penetrates the liquid, having an effect thereon and providing a change in the property of the liquid at a distance of at least 1 meter from the transducer. The property is a gas exchange rate and the change is at least 5%, or the property is surface tension and the change is at least 1%, or the property is viscosity and the change is at least 0.5%.

29 Claims, 7 Drawing Sheets

METHOD OF CHANGING A PROPERTY OF A POLAR LIQUID

CROSS-REFERENCE TO RELATED APPLICATIONS

The present application is a continuation-in-part of U.S. patent application Ser. No. 16/669,793 filed Oct. 31, 2019, the entirety of which is hereby incorporated by reference.

FIELD OF THE INVENTION

This disclosure relates generally to a system and method for the application of an alternating magnetic field to a polar liquid to change a property of the polar liquid, and more particularly, to change the surface tension, interfacial mass transfer, gas absorption, or other property of the polar liquid.

BACKGROUND

Magnetic fields have been applied in various applications to polar liquids to change a property of the liquid. Polar liquids are liquids that contain polar molecules. For a molecule to be polar, it has to experience dipole moments within itself. An electrical dipole moment is caused by unequal electronegativity between atoms in a covalent bond. A water molecule by itself is polar. The term polar liquid used herein refers to a liquid that is at least partially polar such as a mixture of a polar liquid and a non-polar liquid, e.g. water and oil.

Static fields with large gradients have been used to separate particles within fluids. Magnetic fields have been used to reduce scale within pipes, and electromagnetic signals have been used in numerous applications in industry. For example, US Patent Application 20140374236 in the name of Moore et al. describes a liquid treatment device comprising: two antennae; an enclosure for holding a liquid including a solvent and a solute; a generator operatively connected to the two antennae to generate an oscillating voltage in each antenna, wherein each voltage is out of phase with the other to create an oscillating electric field; and the liquid in the enclosure being subjected to the electric field in the presence of a magnetic field to change the chemical and/or physical properties of the solute, without the liquid contacting the two antennae. This device is essentially a conductive wire wrapped around a pipe containing the fluid coupled to a signal generator. Moore et al. suggest that the magnetic field coil may be wrapped around a non-ferrous or ferrous material that is positioned close to the liquid containing enclosure but does not contact the liquid. However, devices attached to a pipe with a polar liquid, such as disclosed by Moore et al. and other prior art references, provide limited output and cannot be used for treatment of open bodies of water such as rivers and industrial ponds.

Relative to open waters, US Patent Application No. 20180216246 in the name of Chew et al. teaches immersing a coil into seawater near a metal structure so as to produce an ionic current in the seawater and thus prevent a corrosion current from leaving the surface of the metal. It is cost efficient to practice the method in the proximity to the metal target. Morse et al. in U.S. Pat. No. 5,606,723 also employ the electric field effected in the liquid; they teach a coil in an air-tight housing, with voltage probe discs attached at the ends of the coil for delivering an electric field into the solution. However, treating large open bodies of water, or any other polar liquid for that matter, remains an open problem, and new transducer devices and methods of their use need to be developed.

SUMMARY

In accordance with an aspect of this disclosure there is provided, a method of changing a property of a polar liquid of a polar liquid, comprising: providing a first device adjacent to the polar liquid or at least partially immersed therein, the first device comprising a first signal generator and a first transducer electrically coupled thereto; and, operating the first signal generator to provide a first alternating electrical signal to the first transducer, wherein the first alternating electrical signal is of a first frequency and a first amplitude to affect the first transducer to produce a resulting alternating magnetic field having a magnetic flux density so as to change the property of the polar liquid, wherein a portion of the alternating magnetic field penetrates the polar liquid, having an effect on the polar liquid and providing a change in the property of the polar liquid at a distance of at least 1 meter from the first transducer, wherein the property of the polar liquid is a gas exchange rate and the change is at least 5%.

In accordance with an aspect of this disclosure there is provided, a method of changing a property of a polar liquid, comprising: providing a first device adjacent to the polar liquid or at least partially immersed therein, comprising a first signal generator and a first transducer electrically coupled thereto; and, operating the first signal generator to provide a first alternating electrical signal to the first transducer, wherein the first alternating electrical signal is of a first frequency and a first amplitude to affect the first transducer to produce a resulting alternating magnetic field having a magnetic flux density so as to change the property of the polar liquid, wherein a portion of the alternating magnetic field penetrates the polar liquid, having an effect on the polar liquid and providing a change in the property of the polar liquid at a distance of at least 1 meter from the first transducer, wherein the property is a gas exchange rate and the change is at least 5%, or the property is surface tension and the change is at least 1%, or the property is viscosity and the change is at least 0.5%. Preferably, the polar liquid is substantially prevented from penetrating the interior of the coil of transducer, or a portion of the alternating magnetic field external to the coil is prevented from penetrating the polar liquid when the transducer is at least partially immersed therein.

In accordance with another aspect there is provided, a system for changing a property a polar liquid, comprising one or more property-changing devices (PCD) devices, each comprising: a signal generator for generating an alternating electrical current and, a transducer comprising: an electrically conductive solenoidal coil coupled to the signal generator for providing the magnetic field, the coil formed of a plurality of loops each having an interior, the loop interiors forming an interior of the coil. In one embodiment, the liquid from outside the coil substantially prevented from penetrating the interior of the coil when the transducer is immersed in the liquid. Each of the transducers may include two ferromagnetic end pieces disposed at the ends of the coil transverse thereto and electrically isolated from the coil, for shaping the magnetic field. In another embodiment, the transducer includes a ferromagnetic cladding around the electrically conductive solenoidal coil and electrically isolated therefrom, for preventing a portion of the alternating magnetic field external to the electrically conductive solenoidal coil from penetrating the polar liquid when the transducer is immersed in the polar liquid and operational. The system may include a control center for controlling the property-changing devices.

In accordance with another aspect there is provided a hardware system comprising a property-changing device comprising: a signal generator and a transducer electrically coupled thereto, wherein the signal generator is configured for providing an alternating electrical signal to the transducer, wherein the alternating electrical signal is of a frequency and an amplitude to affect the transducer at least partially immersed in a polar liquid to produce a resulting alternating magnetic field having a magnetic flux density so as to change the property of the polar liquid at a distance of at least 1 meter from the transducer, wherein the property is a gas exchange rate and the change is at least 5%, or the property is surface tension and the change is at least 1%, or the property is viscosity and the change is at least 0.5%.

In accordance with another aspect there is provided, a method of changing a property a polar liquid, comprising: disposing a first transducer comprising a first electrically conductive solenoidal coil at least partially within the polar liquid, the coil formed of a plurality of loops each having an interior, the loop interiors forming an interior of the coil, wherein the polar liquid is substantially prevented from penetrating the interior of the coil or a portion of the alternating magnetic field external to the coil is prevented from penetrating the polar liquid when the transducer is immersed therein, and applying a first alternating electrical current to the coil so as to produce an alternating magnetic field about the coil, wherein a portion of the alternating magnetic field penetrates the polar liquid and the first alternating electrical current has a first frequency and a first amplitude such that the alternating magnetic field has an effect on the polar liquid which changes gas exchange rate of the polar liquid at a distance of at least 1 meter from the first transducer; further comprising allowing the polar liquid after a period of treatment to flow through pipes or conduits into a drip irrigation system or an aquaculture system.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
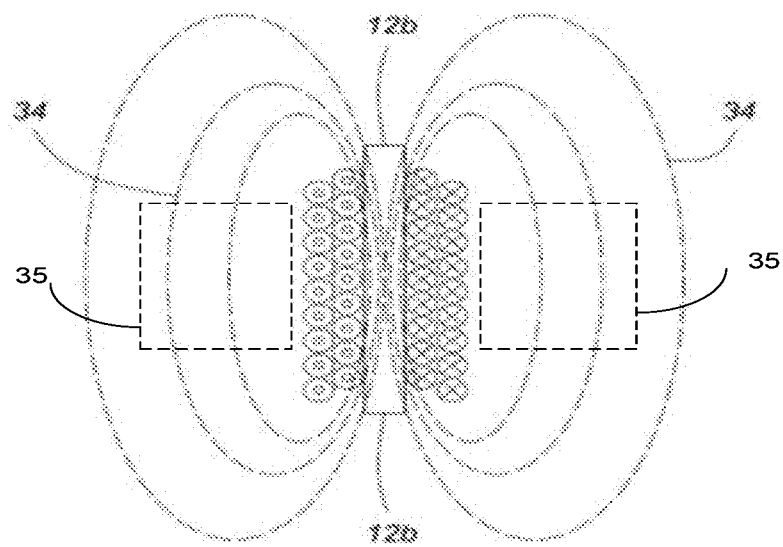
FIG. 1 is a cross-sectional view of a prior art transducer.

We have discovered that by energizing an electrically insulated conductive coil formed of loops of wire with a very small amount of alternating current of under one ampere, and preferably hundreds of microamps or less, and by placing the energized coil into a polar liquid such as water, we can generate an alternating magnetic field emanating from the coil through the insulation that will affect the polar liquid exposed to the magnetic field by changing a property of the polar liquid, such as gas exchange rate or other properties, and that the affected liquid will in turn have an effect on polar liquid a great distance away, of at least 10s of meters, through a contagion or domino effect, changing one or more properties of the polar liquid this large distance from the coil emanating the magnetic field, hereafter referred to as a transducer. The benefits of adjusting the gas transfer rate or other properties are numerous and have applicability to many industrial applications. Advantageously, the loop or coil transducer is insensitive to the conductivity of the polar liquid, and therefore insensitive to the pH of the liquid, thus allowing it to be used in many different liquids irrespective of conductivity or the electrical grounding environment in the vicinity of the treatment vessel.

Attempts have been made to provide submerged devices which emit an electric current, or electric field into water. However, we believe that the presence of an electrical current or electric field may have a deleterious effect. Due to the presence of impurities and admixes, the electric field results in an electrical current which may be hazardous or at least unpleasant for people and other creatures, and may cause corrosion and mineral buildup of structures proximate to the device. The method disclosed herein uses a magnetic field so as to affect the liquid. The electrical current in water, if induced by an immersed device, would produce a secondary magnetic field, different from the magnetic field produced by the current within the device. Our goal is to use a magnetic field without an electric field. Any electric field that might be produced by our coil transducer is unwanted and is less than 1 V/m or significantly less and negligible. The magnetic field may be created by a coil within a transducer, while the electric field produced by the transducer is ideally zero.

We have discovered that using only an alternating magnetic field, and enhancing its effect by shaping the magnetic field, we are able to change properties of a polar liquid at a distance of 40 meters and more with a very low power signal producing a low intensity alternating magnetic field. We believe that, when a properly energized transducer, with a suitable electrical signal having a suitable frequency and amplitude, is placed in a polar liquid, the resulting alternating magnetic field emanating from the coil affects the liquid in close proximity to the coil, changing the liquid's property near the coil. Surprisingly, the effect then expands through the liquid, often in a matter of minutes. The difference should be noted between the speed of the field propagation, i.e. the speed of light in the particular medium, and the speed of the liquid-changing effect which is significantly less than the speed of light. The discovered effect may be envisioned as a domino effect in molecules of the liquid: the magnetic field generated by the transducer affects molecules and/or intermolecular bonds in the liquid proximate to the transducer. What we have discovered is that when we use a signal of suitable frequency and amplitude, the affected portion of the liquid affects another portion of molecules at some distance from the transducer, and so on. The term "domino effect" refers to a linked sequence of events, while the events are not necessarily mechanical as in case of domino tiles. The effect may be referred to as a chain reaction or a contagion effect.

We have found that, when a coil is immersed in a polar liquid and energized with an alternating electrical current, the frequency of the current and thus the rate of change for the magnetic field affect the distance where a particular property of the liquid noticeably changes. In other words, some frequencies are better than others. The same has been observed for the amplitudes of the current supplied to the coil. This may be explained by resonance effects occurring within polar molecules of the liquid and/or in intermolecular bonds under the influence of the magnetic field produced by the coil. It is important that the optimal (preferred) parameters of the current in the coil depend on the application wherein the coil is used. In particular, the optimal parameters may depend on the particular liquid and the monitored property. Nevertheless, it is crucial that the transducer including the coil affects the liquid with only magnetic field with a practically absent electric field external to the coil; thus the parameters of the current are tuned so as to increase the effects caused by the magnetic field. Differently, the prior art tunes parameters of transducers so as to better employ the electric field emitted from a transducer, whereas the inventors of the method disclosed herein suggest tuning parameters so as to better employ the magnetic field provided by a transducer.

FIG. 1 illustrates a magnetic field provided by a solenoidal (cylindrical) coil wound around a straight support 12b. Field lines 34 proximate to the solenoid are substantially parallel to each other and have same polarity. This portion 35 of substantially unidirectional (at a particular moment) magnetic field may provide a cumulative effect which changes a particular property of the polar liquid about where the coil is immersed. It is preferred that coil is a solenoidal coil, since the cylindrical elongate shape of the solenoid provides the magnetic field around the solenoid, the field almost parallel to the longitudinal axis of the solenoid in close proximity to the coil. The ends of the solenoid potentially have a deleterious effect since the polarities of the converging lines of magnetic flux oppose each other, so it is desirable to reduce or possibly exclude that effect. It is desirable to expand the space around the coil where the magnetic lines are close to being parallel to each other, so that more liquid may experience the cumulative effect of the magnetic field. This can be done by using a very long solenoidal coil, or by shaping the magnetic field with the help of preferably planar end pieces at the ends of the coil.

Additionally, field lines within the support 12b have a different polarity. Thus, if the liquid has access to the interior of the coil, the cumulative effect will be negated. Accordingly, it is desirable to prevent the liquid from being affected by the opposite direction of the magnetic field. This may be achieved by preventing the liquid from entering the interior of the coil, e.g. placing a ferromagnetic core or any kind of support or fill within the interior of the coil, or by placing the coil within a container that prevents liquid from entering the interior region of the coil or the polar regions; however the magnetic field must be able to pass through the container. A ferromagnetic core has the effect of increasing the magnetic flux density as well as preventing the fluid from entering the interior of the coil. Any non-ferromagnetic body placed in the interior of the coil preferably extends beyond the ends of the coil so as to prevent access of the liquid to the most concentrated opposing polarities at the magnetic poles.

Experiments have been conducted where a transducer was designed so as to increase the effect of a unidirectional portion of the magnetic field, while preventing another portion of the field, of the opposite polarity, from penetrating the liquid, at each particular moment. The unidirectional portion 35 of the magnetic field is understood as a spatial volume containing a portion of the magnetic field produced by the coil, wherein field lines within the volume are substantially parallel to each other at a particular moment, while may have the opposite direction at another moment.

Figure 8:
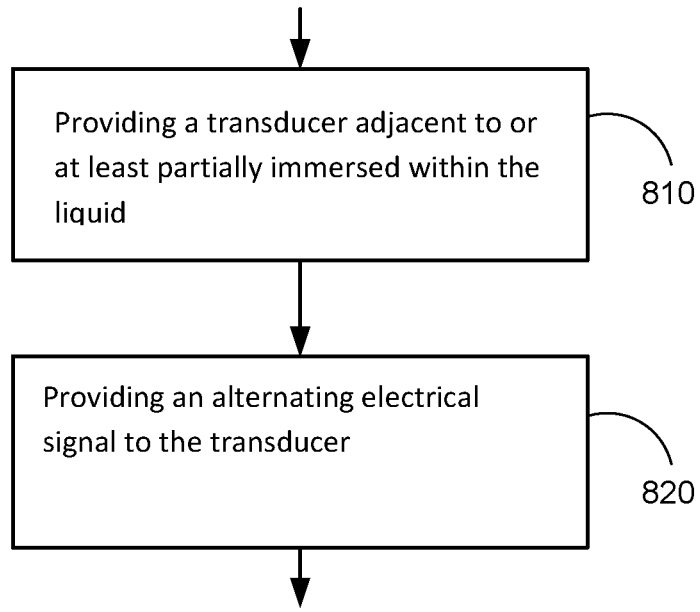
FIG. 8 is a flow chart of the method.

The method of changing a property of a polar liquid includes the following steps: (A) disposing a first device adjacent to the polar liquid or at least partially immersed therein, the device comprising a signal generator and a transducer electrically coupled thereto, and (B) operating the signal generator to provide an alternating electrical signal to the transducer, wherein the alternating electrical signal is of a frequency and an amplitude to cause the transducer to produce a resulting alternating magnetic field having a magnetic flux density so as to change the property of the polar liquid, wherein a portion of the alternating magnetic field penetrates the polar liquid, having an effect on the polar liquid and providing a change in the property of the polar liquid at a distance of at least 1 meter from the transducer, wherein the property is gas exchange rate and the change is at least 5%. The gas exchange rate relates to transfer of gases across a surface of the liquid, wherein the surface may be the liquid-air interface or a surface of a gas bubble in the liquid, etc. In some embodiments, the surface tension of the liquid may change by at least 1%, or the viscosity of the liquid may change by at least 0.5%, or the freezing point may change by at least 0.5 degree C., or the partial vapor pressure may change by at least 1%. We believe that the effect produced by the magnetic field is the domino effect discussed above. Preferably, the transducer produces no electric field outside thereof greater than 1 V/m. Even a very small electric field that may be produced by the coil is unwanted. FIG. 8 illustrates a flowchart of the method, wherein the method steps 810 and 820 may be performed in any order, including concurrent execution.

The method may change intrinsic properties of the polar liquid, such as viscosity, surface tension, equilibrium partial pressure in the gas phase of the polar liquid, maximum dissolved gas saturation concentration for a particular gas, heat of vaporization, a freezing point, or a boiling point of the polar liquid. The advantages of the method have been demonstrated for such properties as gas exchange rate through the interfacial film at the surface of the liquid and that of gas bubbles in the liquid. The inventors believe that other properties of a polar liquid may be controlled using magnetic field as described herein. The value of the change in a particular property of the liquid depends on the nature of the property and physical mechanisms involved. In particular, at the distance of 1 meter from the transducer, the gas exchange rate of the polar liquid may change by at least 5%, or the surface tension of the polar liquid may change by at least 1%, or the viscosity of the polar liquid may change by at least 0.5%, or the freezing point temperature of the polar liquid may change by at least 0.5 degree C., or the partial vapor pressure of the polar liquid may change by at least 1%.

The time necessary for the change to become detectable depends on the distance from the transducer. In our experiments, changes in an interfacial mass transfer rate were noticeable after 2 min at 10 meters, were unmistakable after 6 min, and continued to grow after 96 hrs. The impact was also measurable at 150 m within 24 hrs. In general, a property of the polar liquid changes at the distance of 1 meter within 10 minutes.

The alternating electrical current may have a sine profile, a trapezoidal profile, a triangular profile, etc. The frequency and amplitude of the electrical current used in the transducer depend on the particular liquid and, possibly, on the property desired to be changed. Our experiments show that some frequencies produce the change greater and/or faster than other frequencies. The found parameters are provided herein. When such parameters are not known, the system may be configured to perform a sweep through a range of frequencies, staying at a particular frequency for a predetermined interval of time, while the property of the liquid is monitored. In general, the frequency of the electrical current used to energize the transducer is greater than 100 Hz and less than 5000 Hz, and a root mean square of the amplitude is less than 3 amperes, preferably less than 500 mA, and more preferably less than 50 mA. Notwithstanding, lower and higher frequencies may be practicable.

It should be understood that the method disclosed herein is practicable by simply using a coil having a plurality of turns without having a core $12a$, when the interior of the coil is empty but inaccessible to the liquid, e.g. sealed. In another embodiment, a magnetically permeable core is provided. Alternatively, the core can be a plastic spool for example used to form the many turns of wire resulting in the coil. The spool may be another material, which does not deleteriously affect the transducer's performance, or there may be no spool or core present and the liquid may be prevented from entering the interior of the coil by other means.

FIGS. 2 through 5 illustrate transducers whereby a property such as an interfacial mass transfer rate or other properties of a polar liquid can be changed if the transducer is provided with an alternating signal e.g. of about 2.5 kHz and having a current of about 133 microamperes. Of course, the method is not limited to this frequency or current, as these are just exemplary embodiments that provided surprisingly favorable results. We believe that frequencies between 100 Hz and 20 kHz will produce a change in a property of a polar liquid, with a preferable interval of frequencies between 1 kHz and 5 kHz.

Figure 2:
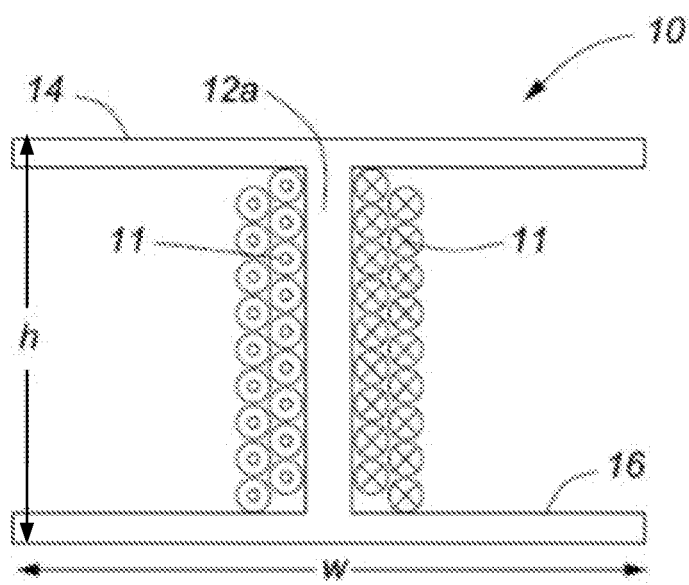
FIG. 2 is a cross-sectional view of a transducer.

FIG. 2 illustrates an exemplary embodiment. A transducer 10 has a solenoidal coil 11 of electrically insulated wire wrapped around the core $12a$. Here and elsewhere in the drawings, a circle with a cross indicates a cross section of a coil loop wherein a current flows into the plane of the drawing, while a double circle indicates a cross section of a coil loop wherein the current flows out of the plane of the drawing. The insulation of the wire allows a magnetic field to pass therethrough. The two ends of the coil are electrically coupled to two terminals of a signal generator (not shown), so that the alternating current can flow through the coil 11 from the signal generator and back to the signal generator. In operation an alternating electrical current in the form of a 2.5 kHz sine wave is provided to the coil 11. The root mean square (rms) of the alternating current amplitude is 133 micro amps. As is well understood, a magnetic field is generated emanating from and external to the coil 11. The transducer 10 has a core $12a$ made of a ferromagnetic material, for example, mild steel or stainless steel. Integral with the core are planar end pieces 14 and 16, also made of mild steel or stainless steel or other alloys, with the relative permeability of from 100 to 5000 and possibly more. The height of the coil 11 and the core $12a$ is h=3.5 cm, and the diameter (max dimension) of the end pieces is W=5 cm.

Figure 3:
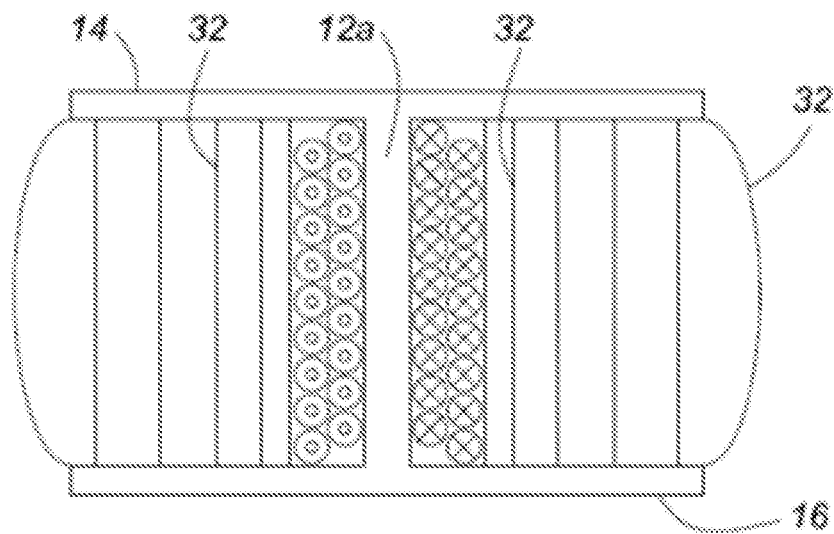
FIG. 3 is a cross sectional view of the transducer illustrating lines of magnetic flux exterior to the coil when the transducer is powered.

FIG. 3 illustrates the magnetic lines of flux 32, which are substantially parallel due to the elongate, substantially straight shape of the core and due to the field-shaping effect of the end pieces 14 and 16 extending normally to the core. Unconstrained, the core $12b$ absent the polar end pieces, the magnetic lines of flux 34 are not parallel as is shown in FIG. 1. To achieve a greater effect on the liquid that the transducer is placed in, it is preferred to have substantially parallel lines of flux. The end caps 14 and 16, on the poles of the core $12a$ of the transducer 10 (FIGS. 2 and 3) concentrate the magnetic lines of flux 32 so that the lines of flux external to the coil 11 and core $12a$ are almost parallel.

Figure 4:
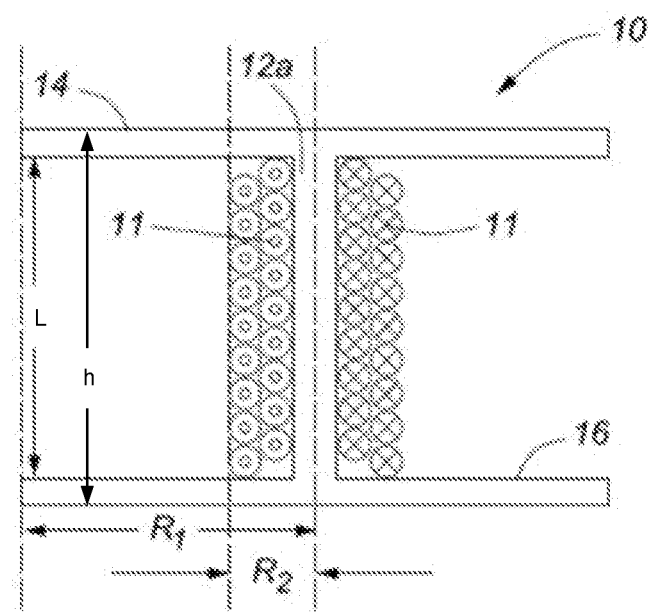
FIG. 4 is a cross-sectional view of the transducer.

Turning now to FIG. 4, the transducer 10 is shown to have a height h and radius $R_1$. Radius $R_2$ defines the radius from the center of the metal core $12a$ to the outside of the coil 11 having N turns. By way of example, the height of the coil L=3 cm, h=3.5 cm, $R_1$=2.5 cm, $R_2$=0.8 cm, N=44 turns of 22 gauge single strand insulated wire. The core was made of mild steel.

Experiments have been made so as to observe the impact of exposure of water to magnetic fields as described herein, on mass transfer rate across the air water interface of bubbles. Several frequency and current pairs have been found to provide better results than others: 2500 Hz at the current of 0.100 mA, 2700 Hz at the current of 0.099 mA, and 4000 Hz at the current of 0.140 mA. The search for preferable parameters was based on theoretical hypotheses of how the technology worked, and included adjusting parameters while the effect has been measured. More such parameters may be found by experimentation. It is expected that the advantageous effect may be achieved for frequency and current deviating from the particular preferable parameters by ±10 Hz and ±15 micro Amperes, respectively. The inventors believe that other frequency and current pairs which result in changing a property of a polar liquid at a distance of at least 10 meters may be found. It should be appreciated that the parameters of the magnetic field and the required electrical signal may vary depending on the liquid, e.g. the level and nature of contamination in water. The geometry of the vessel or water body may also affect the parameters needed to achieve the desired effect. For the embodiment shown in FIGS. 2 through 4, we have demonstrated that preventing a portion of the magnetic field interior to the coil 11 from contacting the fluid, the other portion of the magnetic field, the portion exterior to the coil 11, is able to noticeably and effectively change a property of the liquid it is submerged in. Thus either blocking the inside magnetic field or preventing the liquid from accessing the magnetic field within the interior of the coil allows the field exterior to the coil 11 to significantly change a property of the liquid. The suggested transducer design ensures that magnetic fields in these different regions do not simultaneously pass through the polar liquid or they would have a deleterious effect on each other not producing a desired change in a property of the polar liquid. Preferably the magnetic field interior to the coil of FIG. 2 is totally or substantially prevented from propagating through the liquid, in a less preferred embodiment at least 75% of the magnetic field interior to the coil 11 is prevented from penetrating the polar liquid. Relative to the portion of the magnetic field exterior to the coil, it is desirable that at least 75% of the magnetic field exterior to the coil and emanating from the coil, penetrate the liquid.

Figure 5:
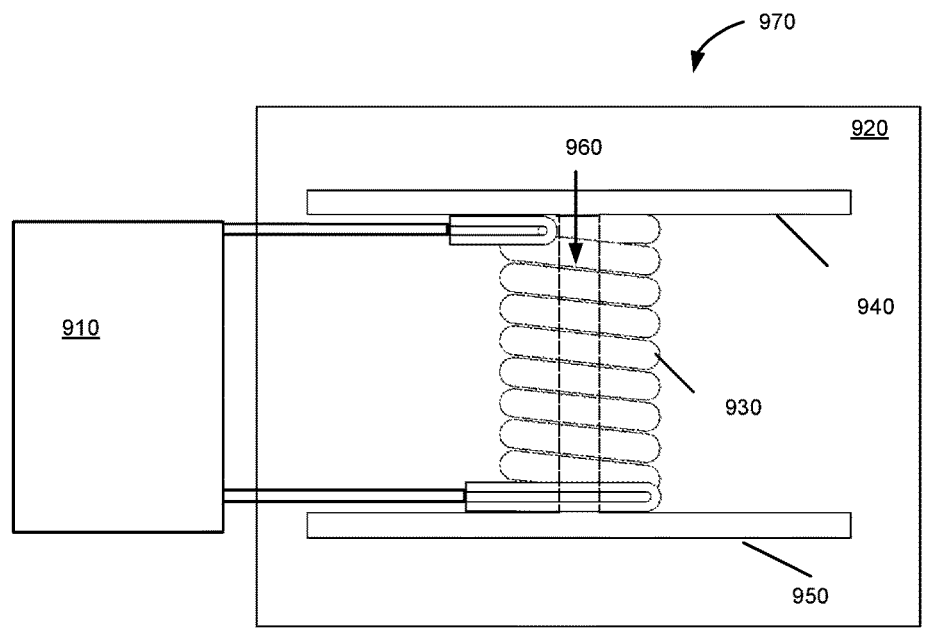
FIG. 5 is an illustration of a system for changing a property of a polar liquid with a magnetic field.

The aforedescribed transducers may be used in a system for changing a property of a polar liquid with a magnetic field. With reference to FIG. 5, the system includes a signal generator 910 for generating an alternating electrical signal, and at least one transducer 920, which has an electrically conductive coil 930 with an insulation which electrically insulates one loop of the coil from one another, though allows a magnetic field to pass through. No electrical current is imparted from the device to the polar fluid.

The coil 930 is coupled to the signal generator 910, so that the generator 910 can provide an alternating electrical current to the coil 930, and so providing magnetic field about the coil 930.

Preferably, the coil 930 is a solenoidal coil, a cylinder in the sense that it has a straight central axis and all cross sections normal to the axis have a same shape, though not necessarily a circle. By way of example, the core 12a (FIG. 3) may be a steel bar with a square cross-section. The wire wound around such a core forms a cylinder wherein a cross section resembles a square with rounded corners. The height of the cylinder is preferably in the range of from 3 cm to 50 cm.

The coil is formed of loops of a conductive metal, such as copper, etc. The number of loops may be in the range of from 20 to 2000. The loops are electrically isolated. Each loop has an empty interior which may be filled e.g. with a support or core around which the loops are coiled. The stack of loop interiors forms an interior 960 of the coil 930. The coil interior 960 is protected from the liquid when the transducer is immersed therein so that a portion of the magnetic field internal to the coil 930 is substantially prevented from penetrating the liquid. The interior 960 of the coil 930 may be filled with some material as discussed elsewhere herein, or sealed. While FIG. 5 shows the coil 930 as having a single layer of wire, the coil 930 may be formed of one, two, or more layers of wire, a next layer looped around a previous layer. FIG. 2 illustrates an embodiment of the transducer described with reference to FIG. 5, wherein the coil 11 has two layers of wire.

The transducer 920 has two end pieces 940 and 950 for shaping a portion of the magnetic field external to the coil 930 thereby causing it to penetrate the liquid. The end pieces 940 and 950 are disposed at the ends of the coil 930 transverse thereto, preferably normally, so that the force lines of the magnetic field between the end pieces are substantially parallel to the central axis of the coil 930. The end pieces 940 and 950 are electrically isolated from the coil. Each of the end pieces 940 and 950 is made of a magnetically permeable material with relative permeability of at least 100 times higher than relative permeability of the polar liquid under the treatment, preferably of a ferromagnetic material such as mild steel or stainless steel or other alloys, with the relative permeability of from 100 to 5000 and possibly more. The end pieces 940 and 950 may be planar and normal to the coil. They may be round and centered at the coil. The diameters (max measurement) of the end pieces are preferably at least half of the height of the coil which, in turn, may be 3 cm≤L≤50 cm. In one embodiment, the end pieces have a radius of at least the outer radius of the solenoidal coil plus the radius of the core. In one embodiment the end pieces are two cones with their apexes directed away from each other and their axis of symmetry coinciding with the central axis of the solenoid.

Figure 7:
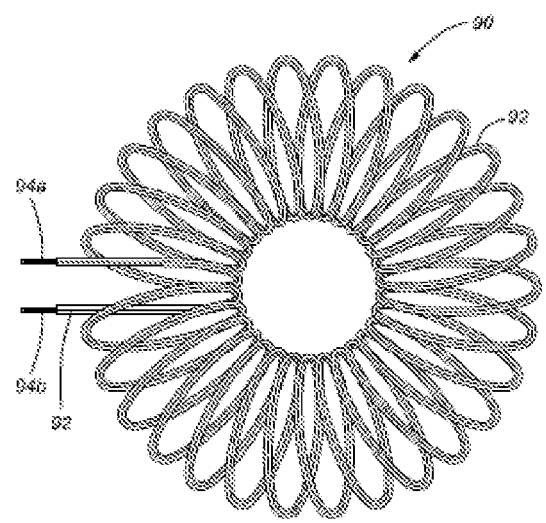
FIG. 7 is a diagram of a toroid transducer.
Figure 7A:
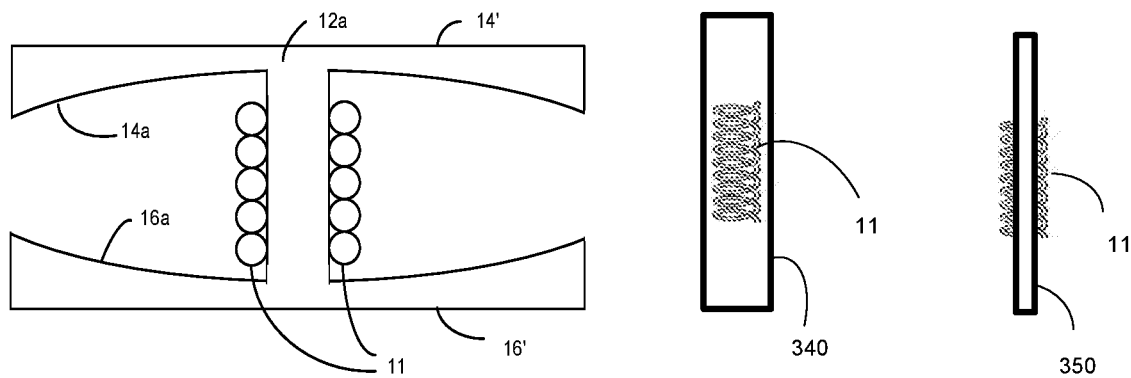
FIGS. 7A, 7B and 7C are illustrations of various embodiments of the transducers.

With reference to FIG. 7A, surfaces 14a and 16a of the end pieces 14' and 16' may be referred to as internal surfaces, in the sense that each of them faces another end piece. The internal surfaces 14a and 16a are sloped or curved so that they are farther from one another at the coil and closer to one another away from the coil. The purpose of such an arrangement is to shape a portion of the magnetic field external to the coil, so as to expand the spatial portion 35 (FIG. 1) around the coil 11, where the field lines 34 are substantially parallel to each other.

Accordingly, a system for providing an alternating magnetic field to a polar liquid for changing a property thereof, or for changing a biological response from biological material within the polar liquid, comprises a first device comprising: a first signal generator for generating a first alternating electrical current; and, a first transducer for at least partially immersing into the polar liquid, comprising: an electrically conductive solenoidal coil for coupling to the first signal generator for providing the alternating magnetic field in response to the first alternating electrical current, the electrically conductive solenoidal coil formed of a plurality of loops each having an interior, the loop interiors forming an interior of the electrically conductive solenoidal coil, wherein the polar liquid is prevented from penetrating the interior of the electrically conductive solenoidal coil when the first transducer is immersed in the polar liquid, and two ferromagnetic end pieces, one at each end of the electrically conductive solenoidal coil transverse thereto and electrically isolated therefrom, for shaping a portion of the alternating magnetic field external to the electrically conductive solenoidal coil and penetrating the polar liquid when the system is immersed in the polar liquid and operational. The system comprises a ferromagnetic core within the interior of the electrically conductive solenoidal coil, electrically isolated therefrom. The two ferromagnetic end pieces are magnetically coupled to the ferromagnetic core or integral therewith, wherein each of the two ferromagnetic end pieces has a surface portion facing another of the two ferromagnetic end pieces, the surface portions are disposed farther from one another at the electrically conductive solenoidal coil and closer to one another away from the electrically conductive solenoidal coil for shaping the portion of the alternating magnetic field external to the electrically conductive solenoidal coil.

The interior 960 of the coil 930 may be filled with any material so as to ensure that the liquid is substantially prevented from entering the interior of the coil and, thus, is not affected by a portion of the magnetic field within the interior of the coil. Ideally 100% of liquid is prevented from entering the interior of the coil. Less preferably, 80% and less preferably 50% is prevented. Water entering the coil has a deleterious effect. In one embodiment, the interior 960 of the coil is filled with one or more non-ferromagnetic materials, i.e. materials with relative magnetic permeability less than or equal to 1 H/m.

In one embodiment, the interior 960 of the coil 930 is sealed e.g. by placing the coil into a container which allows the magnetic field to pass therethrough, so that the interior 960 is not accessible by the liquid when the transducer 920 is at least partially immersed thereto. The end pieces 940 and 950 may be outside of the container so that the liquid can be affected by a portion of the magnetic field between the end pieces. In one embodiment, the coil interior is only partially sealed, while the opening is not in contact with the liquid, e.g. the transducer 920 is disposed at the surface of the liquid.

In one embodiment, the interior of the coil is filled with air or another gas, or a mixture of gases, which may support the device at the surface of the liquid. In another embodiment, there is vacuum inside the interior of the coil, which should be properly sealed.

In one embodiment, the interior 960 of the coil 930 may contain a straight core formed of a material suitable for the end pieces 940 and 950, preferably a ferromagnetic material for increasing the magnetic flux density produced by the coil. The end pieces 940 and 950 may be electrically connected to the core, or integral therewith as illustrated in FIG. 2 wherein the transducer 10 is an embodiment of the transducer 920. However, it is not necessary for the end pieces 940 and 950 to contact the core, though they should be disposed at the ends of the coil, in close proximity thereto and, preferably, in contact with the core. In one embodiment, the core and the end pieces are electrically isolated from the liquid.

The signal generator 910 may be configured for providing a periodic electrical current with a predetermined amplitude and frequency. The current is preferably less than 3 amperes, more preferably less than 500 mA, and more preferably less than 50 mA. A feedback loop may be used to control the electrical signal in dependence upon a measured parameter. The signal generator 910 may be capable of providing a plurality of predetermined frequencies or a predefined range of frequencies, and the system may utilize a frequency determined to be optimum from the plurality of frequencies. A measuring instrument capable of measuring a parameter, such as a value of gas exchange rate, surface tension, viscosity, freezing point temperature, or partial vapor pressure, can be connected to a feedback circuit that can be used to adjust the frequency and amplitude of the signal provided to the transducer to optimize or enhance a process that requires a change in property of the polar liquid.

In particular, the signal generator 910 may be configured to work in at least one of the following modes experimentally found to provide advantageous results: 2500 Hz at the current of 0.100 mA, 2700 Hz at the current of 0.099 mA, and 4000 Hz at the current of 0.140 mA. It is expected that almost the advantageous effect may be achieved for frequency and current deviating from the particular optimal parameters by +/−10 Hz and +/−15 uA, respectively, while the effect may be reduced to about 63% of the peak effectiveness.

The transducer 920 and the signal generator 910 may be part of a PCD device 970 intended to be at least partially immersed in an industrial pond, river, ocean, etc. Preferably, the signal generator and the transducer are housed separately and connected by a pair of wires or a coaxial cable. In one embodiment, the coil is at least partially immersed in the liquid, while the signal generator is not immersed—it may reside on a raft whereto the coil is attached. In another embodiment, the signal generator is at least partially immersed in the liquid. Then the interior of the device 970 provides an electrically isolated space in which to house the electronics required to operate the device. In one embodiment, the device includes floating means, such as foam flotation ballast. In one embodiment flotation is provided by trapping air or foam in the sealed container wherein the electronics are kept. Foam helps to avoid the diurnal expansion and contraction of the air with the accompanying condensation of moisture inside the electronic housing. A metallic strip through the foam may be used to permit the transmission of heat generated by the electronic circuit. The device 970 may have an antenna for wireless communication with a control center or other transducers, and/or a GPS receiver.

In one embodiment, a transducer in the form of a toroid coil 90 as is shown in FIG. 7 arranged in a full circle with its two ends electrically coupled to the signal generator so that a small alternating current can pass through the toroid 90 which in turn generates a magnetic field about the inside of the toroid. Of course, the toroid should be constructed so as to allow the polar liquid to flow through the coils of the toroid itself. This can be done by providing a rigid plastic sleeve 92 which allows a magnetic field to pass therethrough formed in the shape of a toroid and feeding a length of electrically conductive wire 94 into the sleeve. The ends of the wire 94 are electrically coupled to a signal generator, not shown. The wire 94 is itself electrically insulated and allows a magnetic field generated to pass through it.

Since there is only a very weak external magnetic field, external to the toroid 90 itself, and predominantly all of the magnetic field is internal to region of the toroid 90 itself, the problem associated with having two opposing magnetic fields in different regions is substantially obviated. Thus another embodiment of transducer we have developed is a toroid shaped transducer, where the liquid exposed to the internal field affects liquid a distance therefrom and we can therefore change a property of that liquid by applying an alternating current at a predetermined frequency. In operation, the toroid transducer is submerged in a polar liquid and an alternating current signal in the form of a sine wave having a suitable frequency is provided to the transducer.

In one embodiment, a relatively long solenoidal coil is partially immersed in a liquid transverse thereto, so that the top end of the coil and associated curvature of the magnetic field are above the surface and practically do not affect the liquid, while the lower end of the coil and associated curvature of the magnetic field are relatively far below from the surface, thus having little effect on the near-surface layer of the liquid. Then, at each particular moment, the near-surface layer of the liquid is affected by substantially parallel field which changes the liquid's property. The coil may have a core, and may have the interior of the coil sealed at both ends or only at the bottom end leaving the upper end open to the air. The transducer may be supported by a floating means, e.g. a buoy, or be attached to a wall of the vessel or body of water, etc. As in other embodiments, the liquid is prevented from entering the interior of the coil.

In one embodiment, the solenoidal coil is sealed within a water-tight container 340 (FIG. 7A) fitting close along the coil and extending significantly beyond the ends of the coil, by at least 5%, preferably by 10% and, more preferably, by at least 20% of a height of the coil, so as to prevent the liquid from entering the interior of the coil and the polar portions of the magnetic field. The container allows the magnetic field to pass through. Accordingly, a system for providing an alternating magnetic field to a polar liquid for changing a property thereof, or for changing a biological response from biological material within the polar liquid, comprises a PCD device. The device comprises: a signal generator, e.g. the signal generator 910, for generating an alternating electrical current; and, a transducer for immersing into the polar liquid, comprising: an electrically conductive solenoidal coil, e.g. the coil 11, for coupling to the signal generator for providing the alternating magnetic field in response to the alternating electrical current, and a water-proof container, e.g. the container 340, around the electrically conductive solenoidal coil and extending beyond each end of the solenoidal coil by at least 10% of a height of the coil, wherein the magnetic field can pass through the container. Optionally, the transducer includes two ferromagnetic end pieces as described above, disposed at the ends of the coil and transverse thereto for shaping the magnetic field.

In yet another embodiment, the coil has a non-magnetic core 350 extending significantly beyond the ends of the coil, by at least 1 or 5%, preferably 10% and, more preferably, by at least 20% of a height of the coil, for the same purpose. Of course, the transducer may be only partially immersed in the polar liquid. A system for providing an alternating magnetic field to a polar liquid for changing a property thereof, or for changing a biological response from biological material within the polar liquid, comprises a PCD device comprising: a signal generator, e.g. the signal generator 910, for generating an alternating electrical current; and, a transducer for immersing into the polar liquid, comprising: an electrically conductive solenoidal coil, e.g. the coil 11, for coupling to the signal generator for providing the alternating magnetic field in response to the alternating electrical current, the electrically conductive solenoidal coil formed of a plurality of loops each having an interior, the loop interiors forming an interior of the electrically conductive solenoidal coil, and a non-magnetic core, e.g. the 350, in the interior of the electrically conductive solenoidal coil, the core extending beyond each end of the solenoidal coil by at least 10% of a height of the coil, wherein the magnetic field can pass through the container. Optionally, the transducer includes two ferromagnetic end pieces as described above, disposed at the ends of the coil and transverse thereto for shaping the magnetic field.

In one embodiment, the PCD device may be moved across a body of water or other liquid, with the help of a boat, vessel or craft, preferably in a controlled manner, or supported by a buoy or raft. In this embodiment, a waterproof buoyant container houses the battery, and signal generator which is coupled to the transducer. A solar panel is housed on top of the waterproof buoyant container, and is electrically coupled to the battery. The PCD is relatively lightweight and can easily be carried by a person and placed into the water. Housed within the container is a transceiver and control circuitry so that it can be powered and switched off remotely.

In accordance with an aspect of this disclosure there is provided, a method of treating a body of water, wastewater, sewage or sludge having a surface area of at least 100 square feet to increase the amount of dissolved oxygen therein, comprising: at a first location within the body of water, waste water, sewage, or sludge, providing a portable, buoyant device having a signal generator housed therein; and having a submersible transducer electrically coupled to the signal generator; and, operating the signal generator to provide a low power alternating electrical signal of less than five hundred watts and preferably less than one watt to the submersible transducer, wherein the submersible transducer in response to the low power alternating electrical signal produces an alternating magnetic field, wherein the alternating electrical signal is of a frequency and intensity to affect the transducer to produce a resulting alternating magnetic flux density so as to cause neighboring or nearby water molecules influenced by the alternating magnetic flux to influence other more distant water molecules causing a chain reaction throughout a 100 square foot region wherein the effect of applying the alternating magnetic flux density to nearby water molecules increases a gas exchange rate and dissolved oxygen flux rate throughout the 100 square foot region by at least 5% within 24 hours of applying the signal.

In another aspect there is provided, a method of treating a body of water, wastewater, sewage or sludge having a surface area and being at least 15 feet in length, to increase the amount of dissolved oxygen therein, comprising: at a first location within the body of water, wastewater, sewage or sludge, providing a portable, buoyant unit having a source of power coupled to a signal generator housed therein and having a submersible transducer coupled to the signal generator; actuating the signal generator to provide a low power alternating electrical signal having a first frequency and a power of less than 5 watts and preferably orders of magnitude less to the transducer, wherein the transducer is designed to produce an alternating magnetic field which emanates into the water, wastewater, sewage or sludge when placed therein in response to the low power alternating electrical signal, wherein the first frequency and power of the alternating electrical signal produces a resulting magnetic flux in the water, wastewater, sewage or sludge which causes water molecules adjacent to the transducer influenced by the alternating magnetic flux to influence other more distant water molecules causing a chain reaction at least 15 feet from the transducer, wherein alternating frequency and magnetic flux density is such as to cause a gas exchange rate increase and dissolved oxygen flux rate by at least 2 times from baseline at least 15 feet from the first location within 24 hours of applying the signal.

In one embodiment, the solenoidal coil 11 is not immersed in the liquid, but disposed in close proximity thereto, e.g. on a wall or under a bottom of a container with the liquid, or on a lid of the container where the liquid is contained or passing therethrough. The container is substantially transparent for the magnetic field, at least at the location where the coil is attached. By way of example, the container may have a glass or plastic window used for this purpose. Other materials which allow a magnetic field to pass through, but stop the liquid may be used. Preferably, the coil is as close to the liquid as possible. The distance between the liquid and the coil is preferably less than a diameter of the solenoidal interior. The coil 11 is formed of loops of a conductive metal, such as a copper wire. The electrically conductive wire is electrically isolated, e.g. covered with a jacket so as to electrically isolate the coils from one another and from the liquid. The number of loops may be in the range of from 20 to 2000 or more. Each loop has an interior, and a stack of loop interiors forms an interior of the coil 11. In this embodiment, the container is not within the interior of the coil, and the coil is not within the container. To the contrary, the container and the coil are external to one another.

Accordingly, one aspect of this disclosure suggests a method of providing an alternating magnetic field to a polar liquid for changing a property thereof, or for changing a biological response from biological material within the polar liquid, comprising: providing a transducer comprising an electrically conductive solenoidal coil formed of a plurality of loops, disposing the coil proximate to a container wherein the polar liquid resides or passes through, wherein the container and the coil are external to one another, and applying an alternating electrical current to the coil so as to produce an alternating magnetic field about the coil, wherein the alternating electrical current has a frequency and an amplitude such that the alternating magnetic field has an effect on the polar liquid providing a change in a property of the polar liquid. A human body may be seen as such a container.

Figure 7B:
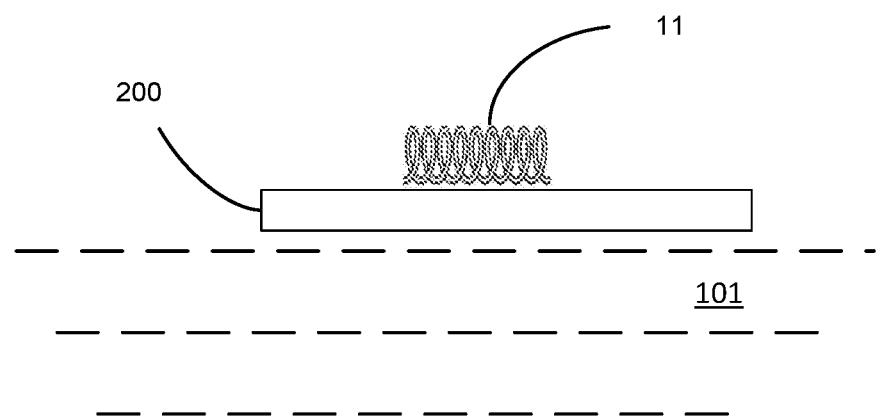

Yet another aspect of this disclosure suggests a method of medical or non-medical treatment, comprising providing an alternating magnetic field to a polar liquid for changing a property thereof, or for changing a biological response from biological material within the polar liquid, comprising: disposing a transducer comprising an electrically conductive solenoidal coil proximate to a human or animal skin, and for a predefined interval of time applying an alternating electrical current to the coil so as to produce an alternating magnetic field about the coil, wherein the alternating electrical current has a predefined frequency and a predefined amplitude. With reference to FIG. 7B, the coil 11 may rest on a floating platform 200. The platform is substantially transparent for the magnetic field, at least at the location where the coil is disposed, or may have a glass or plastic window used for this purpose. Again, the distance between the liquid 101 and the coil is less than a diameter of the solenoidal interior. Preferably, the platform supports the signal generator which provides an alternating electrical current to the coil 11. Preferably, the coil 11 is a solenoidal coil, i.e. a cylinder in the sense that it has a straight central axis and all cross sections normal to the axis have a same shape, though not necessarily a circle. The cylindrical elongate shape of the solenoid ensures that the field lines of the magnetic field in the liquid proximate to the solenoid, are substantially parallel to the longitudinal axis of the solenoid. The coil may be disposed adjacent, or mounted on a wall, lid, or bottom of the container. The platform 200 or any other support/floating means are disposed between the exterior of the coil 11 and the liquid 101, as illustrated in FIG. 7B. Another aspect of this disclosure suggests a method of providing an alternating magnetic field to a polar liquid for changing a property thereof, or for changing a biological response from biological material within the polar liquid, comprising: providing a transducer comprising an electrically conductive solenoidal coil supported by a support on a surface of the polar liquid, wherein the support and the polar liquid are external to the coil, and applying an alternating electrical current to the coil so as to produce an alternating magnetic field about the coil, wherein the alternating electrical current has a frequency and an amplitude such that the alternating magnetic field has an effect on the polar liquid providing a change in a property of the polar liquid.

Figure 7C:
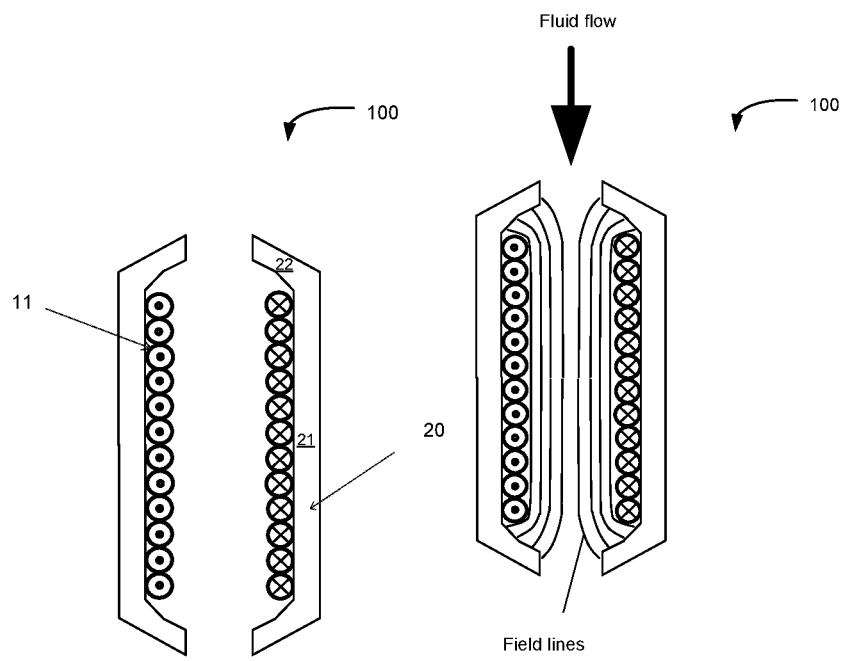

With reference to FIG. 7C, a transducer 100 has a solenoidal coil 11 with its interior open to the liquid, employing a unidirectional portion of the magnetic field so as to change a property of a polar liquid, while shielding another portion of magnetic field external to the coil. When the transducer 100 is immersed in a polar liquid, the interior of the coil is accessible by the liquid. Therefore, that portion of the liquid is affected by the substantially unidirectional (at a particular moment) magnetic field portion. As to the external portion of the magnetic field, it is desirable to eliminate its effect on the liquid. The ends of the solenoid potentially have a deleterious effect as well, since the polarities of the converging lines of magnetic flux oppose each other, so it is desirable to reduce or possibly exclude that effect as well.

Preferably, the coil 11 is a solenoidal coil, i.e. a cylinder in the sense that it has a straight central axis and all cross sections normal to the axis have a same shape, though not necessarily a circle. The cylindrical elongate shape of the solenoid ensures that the field lines of the magnetic field in the interior of the solenoid is substantially parallel to the longitudinal axis of the solenoid. The height of the coil may be in the range of from 3 cm to 50 cm. The number of loops may be in the range of from 20 to 2000. Each loop has an interior, and a stack of loop interiors forms an interior of the coil 11. The outer regions of the coil 11, and preferably the ends of the solenoid as well, are covered with a cladding 20, also referred to as a container or a cover.

The cladding 20 serves the purpose of preventing a portion of the alternating magnetic field external to the electrically conductive solenoidal coil from penetrating the polar liquid when the system is immersed in the polar liquid and operational. The cladding 20 may be formed of a ferromagnetic material, possibly of mild steel or stainless steel or other alloys, with the relative permeability of from 100 to 5000 and possibly more. Other materials may be used for the cladding 20, which will guide the outer field from the liquid and into the material. The cladding may be formed on the outer surface of the solenoid or adjacent thereto. In one embodiment, the cladding is substantially a cylinder around the solenoidal coil. In another embodiment, the cladding includes a cylinder 21 as shown in FIG. 7C.

The end portions 22 of the cladding, at the ends of the solenoidal coil, are transverse to the cylinder walls 21 of the cladding. They cover the ends of the coil so as to shield, as much as possible, the liquid from the portions of the magnetic field at the ends of the solenoid. In one embodiment, some filling is disposed between the coat 20 and the coil 11. Preferably, the filling cannot be permeated with the liquid. The cladding 20 may be seen as a ferromagnetic exo-"core", which is used to shape the magnetic field at the magnetic poles (ends of the solenoid) to minimize instantaneous polarity ambiguity and to entirely capture the magnetic field exterior to the solenoid. In operation, the transducer is immersed in the liquid so that both ends of the channel are accessible by the liquid. The transducer may be stationary or moved through a body of a polar liquid in order to increase the throughput. The transducer may be pulled through water behind a boat or something which could move it through water, behind a ship, for example. The transducer may be pushed by being mounted in front of a ship or beside one. The transducers may be mounted in front of a boat or any other vessel, or mounted towards the front end of the vessel, so as to reduce the viscosity of the water and allow the vessel to move more efficiently.

In one embodiment, the signal generator is mounted on a moving raft, which also moves the submerged transducer. The transducer 100 (FIG. 7C) also includes a signal generator, not shown, for generating an alternating electrical current and providing it to the coil 11. Thus, one aspect of the disclosure provides a system for providing an alternating magnetic field to a polar liquid for changing a property thereof, or for changing a biological response from biological material within the polar liquid. The system comprises a PCD device comprising: a signal generator for generating an alternating electrical current; and, a transducer for immersing into the polar liquid, comprising: an electrically conductive solenoidal coil for coupling to the signal generator for providing the alternating magnetic field in response to the alternating electrical current, the electrically conductive solenoidal coil formed of a plurality of loops each having an interior, the loop interiors forming an interior of the electrically conductive solenoidal coil, wherein the interior of the electrically conductive solenoidal coil has a channel for the polar liquid to pass through when the transducer is immersed in the polar liquid, and a ferromagnetic cladding around the electrically conductive solenoidal coil and electrically isolated therefrom, for preventing a portion of the alternating magnetic field external to the electrically conductive solenoidal coil from penetrating the polar liquid when the transducer is immersed in the polar liquid and operational.

The aforedescribed transducers together with signal generators such as the generator 910 (FIG. 5) may be used in property-changing devices (PCD) for performing the method disclosed herein, comprising: disposing a first transducer at a first location, adjacent to or at least partially immersed in the liquid, step 810 (FIG. 8), and operating the signal generator to provide an alternating electrical signal to the transducer, wherein the alternating electrical signal is of a frequency and an amplitude to cause the transducer to produce a resulting alternating magnetic field having a magnetic flux density so as to change the property of the polar liquid, wherein a portion of the alternating magnetic field penetrates the polar liquid, having an effect on the polar liquid and providing a change in the property of the polar liquid at a distance of at least 1 meter from the transducer, wherein the property is gas exchange rate and the change is at least 5% (step 820). Alternatively, other properties of the polar liquid at that location may change as well: the surface tension may change by at least 1%, or the viscosity may change by at least 0.5%, or the freezing point may change by at least 0.5 degree C., or the partial vapor pressure may change by at least 1%. In order to employ a substantially unidirectional portion of the magnetic field, in one embodiment the liquid from outside of the transducer is substantially prevented from penetrating the interior of the coil when the transducer is immersed in the liquid, and in another embodiment a portion of the alternating magnetic field external to the electrically conductive solenoidal coil is substantially prevented from penetrating the polar liquid when the transducer is immersed in the polar liquid.

Figure 6:
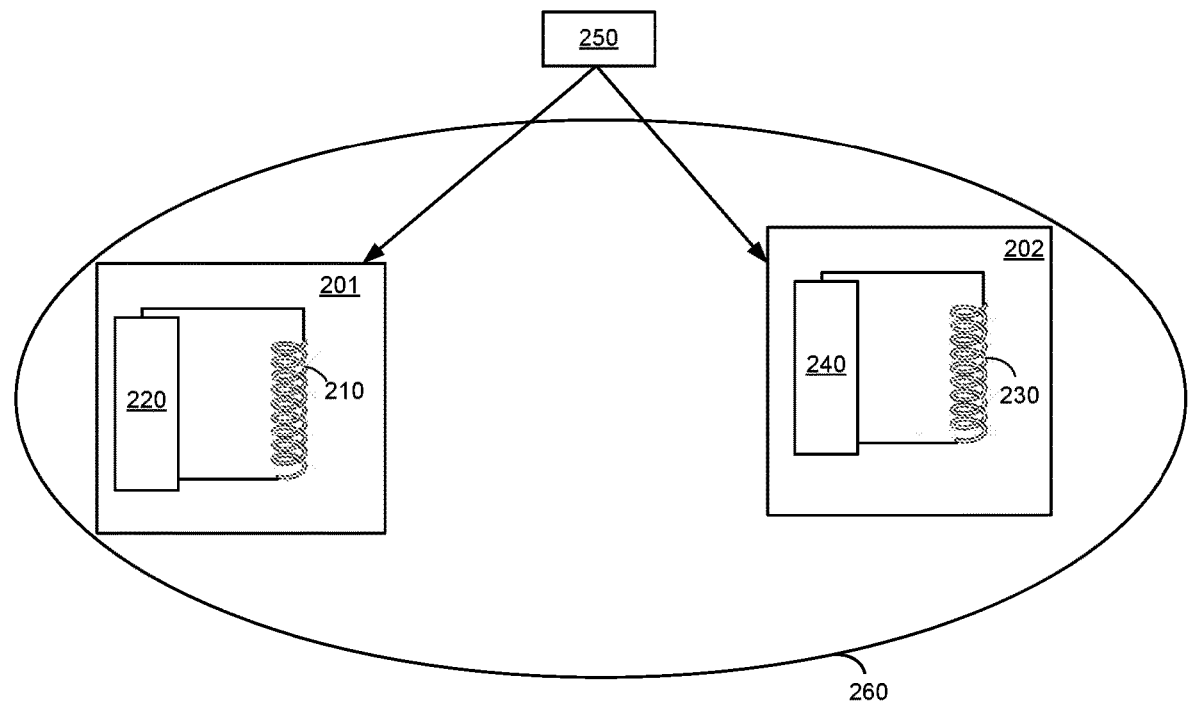
FIG. 6 is an illustration of a multi-transducer system.

With reference to FIG. 6, the aforedescribed transducers may be used in a multi-transducer system which includes at least two transducers 210 and 230 and a control center 250. Each of the transducers includes a coil for generating magnetic field when provided with an alternating electrical current. Preferably, the transducers are cylindrical coils and include end pieces as described above. However, other transducers may be used under control of the control center 250. Preferably, each of the transducers is electrically connected to its own signal generator. As shown in FIG. 6, a first signal generator 220 provides an alternating electrical current to the first transducer 210, and a second signal generator 240—to the second transducer 230. In another embodiment, one signal generator provides an electrical current to two or more transducers.

Turning back to FIG. 6, the transducers may be placed in a vessel or an open body of water or sludge, etc., 260. By way of example, immersive devices 201 and 202, each incorporating a transducer and preferably a signal generator, may be placed at a distance D (20 cm≤D≤300 m) from one another at least partially immersed in an industrial pond, river, lake or ocean. The control center 250 may be located ashore or elsewhere and communicate with the devices 201 and 202 over any communication protocol, preferably wirelessly. In one embodiment, multiple transducers may be deployed without a controller. The transducers may run independently of each other, or coordinate with each other via a peer-to-peer protocol.

We have discovered that by placing two same transducers, for example, two coil transducers, within a polar liquid or body of water, different effects can be obtained depending upon how the two transducers are operated. This provides a convenient way, in which a desired property of the polar liquid may be controlled, such as viscosity, surface tension, equilibrium partial pressure in the gas phase, maximum dissolved gas saturation concentrations, heat of vaporization, and freezing or boiling point of the polar liquid.

Two or more transducers may be used together and controlled from a same control center, wherein frequencies of the electrical current in the transducers are same and the first and second alternating electrical currents are in phase, having a zero degree phase relationship for increasing the change in the polar liquid. We have discovered that by using two transducers 10 provided with a same frequency alternating signal and wherein the signals are in phase, interfacial mass transfer rate was increased further than the increase provided by a single transducer. By way of example, a 16% increase in interfacial mass transfer rate provided by a single transducer was further increased to 20% when a second transducer having the same frequency and in phase was introduced; the transducers should be spaced apart a suitable distance to maximize a desired effect. For example, a plurality of transducers can be spaced along a water body such as a channel in order to change the freezing temperature of the water in the regions of the channel about which the transducers are placed. Adjusting the phase between the two signals provided to two transducers so that the two signals were out of phase, that is, offset or skewed in phase by varying amounts attenuated the desired effect. The property change lessened down to close to or about zero, in this instance the transducers having little or no effect. Notwithstanding, since skewing the phase attenuated the desired effect, tuning in manner by adjusting the phase by small offsets (gradually) is a way in which control of the desired effect can be achieved. For example a 20% increase in interfacial mass transfer rate achieved with two transducers having signals in phase, could be lessened for example to 10% by skewing the phase accordingly.

Furthermore, two or more transducers may be used together and controlled from a same control center, wherein frequencies of the electrical current in the transducers differ from one another, for changing the property of the polar liquid oppositely to the change caused by one transducer alone. The opposite changes are understood as opposite with respect to a baseline of the property when the liquid has not been treated by a magnetic field. The baseline is the natural state of the liquid before the transducer(s) are turned on and affect the liquid in any manner. By way of example, one transducer may increase a particular parameter measuring a property of the liquid above the baseline characterizing the untreated liquid, while two transducers with offset frequencies will decrease the same parameter below the baseline.

We have discovered that a difference in frequency between two transducers by even 1 Hz changed the effect on the polar liquid, decreasing interfacial mass transfer rate below that of untreated polar liquid rather than increasing interfacial mass transfer rate. Interfacial mass transfer rate is one of many properties that can be changed. The same effect was found with a 5 Hz offset in frequency. If we offset the phase gradually, the effect is attenuated more and more all the way down to zero. This is important as it allows us to control the intensity of the effect.

Advantageously, the system disclosed herein can be placed within any liquid that will accommodate it. It can be scaled up, or down in size as required. Different industrial applications may dictate different depth of placement of our device. In most open water bodies the remediation effort is driven by the oxygen transfer on the surface of the water body. Placing one or more transducers near the water surface with a floating device to accommodate a fluctuating water level is the preferred embodiment. In contrast prior art systems which require being external to a pipe or conduit in which water flows, requires a pipe that will allow a magnetic field to penetrate and flow through without significantly affecting the field. Furthermore, such systems cannot easily be moved from one location to another. Once fixed to a pipe it typically remains in place.

The transducer described heretofore or a plurality of such transducers, spaced apart and in various modes of operation, may be used for altering water conditions in a water body by increasing levels of dissolved oxygen and increasing oxidation-reduction potential (ORP) in the presence of a low intensity magnetic field to favor the growth of aerobic bacteria and added diatoms as a means of suppressing residual ammonia concentration and the growth of cyanobacteria and the like.

The overabundance of cyanobacteria in stagnant waters, as a result of the eutrophication of water, is a worldwide problem, especially because of the fact that vegetative secretions of cyanobacteria can be toxic.

Currently, cyanobacteria in stagnant waters of lakes and dams are disposed of by means of biomechanical equipment using float structures, built on the principles of biological reduction of phosphorus and nitrogen in water by cultivating special aquatic plants. The disadvantages of these devices are low efficiency, requirement of taking care of plant growth and limitations due to the vegetation period of plants.

Accordingly, the disclosure provides a viable, cost effective system and method for significantly reducing the presence of residual ammonia, and cyanobacteria commonly known as blue-green algae, from large bodies of water where it is present. Seeding bodies of water with diatoms had been found to lessen the presence of blue-green algal blooms or red-tide algal blooms. However, this treatment alone has not been found to be always reliable and effective enough.

A method in accordance with this disclosure is provided for lessening the presence of residual ammonia and/or blue-green algae comprising: seeding a body of water with a population of diatoms; adding small amounts of nitrates and micronutrients if warranted by the chemical make-up of the water body, and, changing an aspect of the body of water by submerging a transducer into the water and providing a magnetic field within the body of water so that the diatoms and the nitrification bacteria in the water are "activated" in the presence of a high ORP and more dissolved oxygen than would otherwise be present in the absence of the provided magnetic field.

A surprising unexpected aspect of the method disclosed herein is that a very low intensity alternating electrical signal can affect the amount of dissolved oxygen, ORP (oxidation reduction potential) and other physicochemical properties of the water and as a result the growth of diatoms and nitrification bacteria as far as 50 meters or more from the source of the signal. We believe this effect is a function of the domino phenomenon described heretofore, whereby certain properties of water molecules subjected to a magnetic field are changed, affecting other nearby molecules and this repeated for considerable distance.

A diatom is a single-celled alga that has a cell wall of silica. Diatoms can assimilate both ammonia and nitrates in their growth. Unlike cyanobacteria, which do not have an internal membrane, nitrates can migrate through the cell membrane of diatoms and be reduced to ammonia inside the diatoms before being converted into amino acids for the growth of the diatoms and their reproduction through cell splitting. On the other hand, the presence of ammonium ions in the water is necessary for the germination of spores and heterocysts of cyanobacteria. The competition for the ammonia in the water by blue-green algae and diatoms may also be influenced by the nitrogen-phosphorous (N:P) ratio in the water.

Published studies have shown the competitive uptake of ammonia and nitrates by diatoms, cyanobacteria (blue-green algae) and chlorophylls (green algae). Diatoms, especially the species consisting of combinations of *Cyclotella meneghiniana, Synedra ulna* and various species of *Nitzschia* have high rates of uptake of nitrates when biological oxygen demand (BOD) exceeds 5 ppm.

Under the high dissolved oxygen and ORP (+50 to +350 mV) environment generated by the transducer(s), most ammonium ions are oxidized to nitrates by the aerobic nitrification bacteria present in the water body. However, when there is a heavy presence of organic sludge, it competes for the dissolved oxygen in the water as demonstrated by the repeated decline of dissolved oxygen to near zero in water bodies during the night. The presence of ammonium ions in the water bodies will likely persist until the sludge-induced competitive demand for dissolved oxygen begins to decline. Consequently, the continuing presence of blue-green algae will also persist until there is sufficient dissolved oxygen and/or diatoms in the water to eliminate any significant presence of ammonia and/or phosphates in the water. Seeding the water body with diatoms alone will not be effective in consistently suppressing the growth of blue-green algae.

However, seeding the water body with diatoms and subjecting the water body to a magnetic field by submersing a transducer within the water body can lessen the amount of blue-green algae in that body of water, over time.

In order to affect a water body that is to be treated, the magnetic field must be able to penetrate the water under treatment at some point, from which point the domino effect travels through the water body beyond the immediate vicinity of the transducer that introduced the magnetic field to the water. This can be achieved by generating a current dependent upon a signal produced by a signal generator. A sine wave having a predetermined frequency and amplitude is used to generate a desired signal for providing a desired current to an effector or transducer which results in a magnetic field being generated about and external to the transducer emanating from the transducer. Providing a transducer that is submerged in the liquid to be affected has numerous advantages. For example, a properly sized transducer of this type energized by an alternating signal can be used to alter a property of water in a lake, a pond, sewage lagoon, water reservoir, storm water pond and similar water bodies, a container or a pipe by being introduced directly into the liquid sample to be treated. Furthermore, a transducer of this type operates at very low power in the milliwatts range to have far reaching effects. We have discovered that a properly sized transducer in accordance with this disclosure is able to affect the amount of dissolved oxygen in water tens of meters from where the transducer is placed over time. With a transducer we used, in one instance surprisingly a signal of approximately about 133 microamperes, at a frequency of about 2.5 kHz was able to generate an effect that was measurable over 40 meters away from the point of treatment in open water.

The method disclosed herein may include exposing seeded diatoms within a large body of water to a low power alternating magnetic signal using the transducer described. Depending on the residual ammonia concentration and the extent of presence of blue-green algae in the water body, the effective live diatoms concentration in the water body should be in the range of 100-10,000 medial counts per milliliter (ml). Subject to cost effectiveness considerations, the preferred live diatoms concentration would be 1,000-5,000 medial counts per ml. Nurturing a live diatoms concentration above 10,000 medial counts per ml may be preferable for water bodies requiring extensive and accelerated treatments. The high dissolved oxygen and the growing presence of the diatoms will foster a growing population of fish. The growth of the diatoms and its consumption by the fish will restore a balanced ecology for the water body. Live diatoms with nitrates and/or micronutrients may be sourced from commercial suppliers, such as, Lake Savers, Nualgi Ponds, etc.

The body of water can be pretreated by first providing the low power signal to the water well in advance of seeding, and continuing to provide the signal for a duration of time after seeding takes place.

Alternatively, if there is an absence of fish in the water body and the dissolved oxygen concentration is below 3 milligram per liter (mg/l), the body of water is preferably first treated by a transducer energized with a low power signal as described above, until the dissolved oxygen level is consistently above 3 mg/l before added live diatoms are introduced. With the continuing application of the low power signal, the preferred dissolved oxygen level should be consistently above 6 mg/l and the ORP consistently above +150 mV. After the seeding of live diatoms and when the live diatoms concentration is at least 1,000 and preferably 5,000 medial counts per ml or higher, native fish may be introduced into the water body to maintain an ecological balance and algae bloom and the infestation of pest species, such as *Daphnia*, are suppressed.

In another embodiment, the dissolved oxygen in the water body may be 6 mg/l. The transducer with the low power signal should still be deployed shortly before or after the seeding of live diatoms into the water body to maintain an ORP consistently above +150 mV and to "activate" the live diatoms and the nitrification bacteria.

In a waste water lagoon where there is a continuing input of nutrients, the application of the transducer with the low power signal may be continued to maintain a high dissolved oxygen level above 3 mg/l, an ORP above +150 mV and a live diatoms concentration above 1,000 medial counts per ml.

If during the treatment process, the live diatoms concentration should fall below 1,000 medial counts per ml, another seeding of live diatoms into the water body may be undertaken with the objective of consistently maintaining a live diatoms concentration of 2,000 to 5,000 medial counts per ml in the water until the targeted residual ammonia concentration and the desired control of blue-green algae have been accomplished.

In another embodiment, if the live diatoms concentration of the targeted water body is above 5,000 medial counts per ml, applying the low power signal alone without further live diatoms seeding may be adequate to achieve the targeted residual ammonia concentration and control of the blue-green algae.

If the targeted water body is covered by a solid sheet of ice, the deployment of the low power signal may be accompanied by an underwater air diffuser to provide an adequate source of oxygen to raise the dissolved oxygen level and the associated ORP in the water to the preferred dissolved oxygen levels above 6 mg/l and the ORP above +150 mV.

In accordance with the present disclosure, a robust living aquatic environment may be maintained by using an alternating magnetic signal in a body of water to generate high dissolved oxygen and ORP across a large water surface in combination with the simultaneous seeding of diatoms and the addition of small amount of nitrates and micronutrients, if warranted, to promote the growth of the diatoms and to suppress the germination of spores of blue-green algae. A simultaneously healthy native fish population will help maintain the desirable ecological balance of the water body.

In summary, we have found that by providing a properly designed transducer we are able to affect physicochemical properties of water at least 150 meters away from where the effector is placed and submerged in a large body of water irrespective of the conductivity of the water. Furthermore, this can be done using a very low power signal that can be energized from a solar panel with accompanying battery for energy storage. We believe that doing this in combination with seeding a body of water with diatoms and, if warranted, small amount of nitrates, micronutrients and a population of fish native to the area, may have a profound effect and can significantly lessen the presence of residual ammonia, cyanobacteria and/or water borne insect infestation present in a lake, pond, stream or lagoon.

In one embodiment, the transducer and signal generator described heretofore is used to separate different constituents in an emulsion where one is a polar liquid. Oil-in-water is one of many emulsions that this disclosure relates to. Generally, however, this disclosure relates to separation of a polar and non-polar liquid, which form an emulsion.

Removal of oil from oil-in-water emulsions is an important process in oil fields and refineries. When compared to methods, such as chemical de-emulsification, gravity or centrifugal settling, pH adjustment, filtration, heat treatment, membrane separation, and the like, methods using electric fields have been considered attractive because they have the potential for increasing throughput, saving space, and reducing operating costs for many water-removal applications. The use of electric fields for separating water from water-oil mixtures of crude oil was first demonstrated in 1911, and numerous studies have been conducted more than a century for optimizing the process and expanding on the original idea. Separation oil from water is known using magnetic fields whereby particulate matter having magnetic properties is added to the emulsion, binds to the oil, and a magnet is used to pull these along with oil from the water. Although some of these electrical/magnetic ideas may have some benefit, very few of them have been demonstrated to be cost effective for commercialization. There is significant room for improvement in the field of separation of emulsion constituents.

In one embodiment, two transducers separated by a distance of approximately 1 meter between them are fixed on the mixing chamber inside wall opposite from the inlet port of the chamber at or about 10 cm from the bottom of the mixing chamber.

In one embodiment, one or more transducers with aligned frequencies, phase, amplitudes may be fixed in a conventional separator chamber on the inside wall near the inlet port of the separator chamber, such as a dissolved or dispersed air flotation unit, to allow the magnetic field to change the physicochemical properties, such as, a reduction of the viscosity of the polar liquid to achieve higher settling/rising velocity of the non-polar coalesced droplets to achieve accelerated separation.

In the case of the dissolved air flotation unit, the separation is particularly slow because very fine air bubbles precipitate out of solution and attach themselves to the non-polar liquid particles, which tend to rise very slowly. The magnetic field affecting properties of the liquid as disclosed herein may provide more buoyancy and a speedier ascend of non-polar particles.

The method disclosed herein may also lower the viscosity of the polar liquid. This lower viscosity will permit the coalesced non-polar liquid particles and/or the air bubbles in a dispersed air flotation unit to ascend faster through the polar liquid and accelerate the separation.

In this embodiment, the method will increase the processing capacity of both the dissolved air flotation unit and the dispersed air flotation unit.

In another embodiment, a transducer placed inside a pipe elbow near the inlet port of an American Petroleum Institute (API) oil/water separator will impose the specified magnetic field on the emulsion flowing past the transducer. The treatment effect may expand and persist in the polar liquid as the emulsion flows gently through the plates inside the API oil/water separator. The lower viscosity of the magnetically treated polar liquid may encourage more rapid migration of the non-polar liquid droplets towards the plates in the API oil/water separator to result in a faster separation and a higher processing capacity of the separator.

In another embodiment of the method, in the process of separating milk fats from raw milk which is an aqueous emulsion of milk fats, a transducer placed on the inside wall of or suspended in a milk storage tank 10 cm from the bottom near the inlet port may impose the specified magnetic field on the raw milk flowing past the transducer. The treatment effect may expand and persist in the polar liquid as the milk is subjected to the centrifugal force inside the centrifuge. The lower viscosity of the magnetically treated polar liquid may encourage more rapid migration of the non-polar liquid droplets (cream) towards the centre of the centrifuge to result in a faster separation and a higher processing capacity of the separator. Alternatively, this method may permit a lower rotational speed of the centrifuge with a resulting lower capital cost and operating cost in the separation of cream from raw milk.

In order to affect an emulsion that is to be treated, the magnetic field should be able to penetrate the polar liquid under treatment at some point, from which point the effect of magnetically affected polar molecules migrates through the polar liquid beyond the immediate vicinity of the transducer that introduced the magnetic field to the emulsion. Therefore, a change in property such as surface tension reaches a great distance through this domino effect. Affected water molecules affect other nearby water molecules and this surprisingly continues outward for some distance. This can be achieved by generating a current dependent upon a signal produced by a signal generator. A sine wave having a predetermined frequency and amplitude is used to generate a desired signal for providing a desired current to a transducer which results in a magnetic field being generated about and external to the transducer emanating from the transducer. Providing a transducer that is submerged in the liquid to be affected has numerous advantages. Treating an emulsion in a smaller containment vessel is practicable.

One embodiment of this disclosure relates to using the transducer described heretofore for accelerated absorption of gaseous oxygen in oxygen delignification of wood pulp. When the gaseous oxygen and the pulp slurry enter the mixer, the gaseous oxygen is dispersed into small bubbles in the pulp slurry. The mixer pumps the resulting mixture of gaseous oxygen and the medium consistency (85-90% water) wood pulp slurry into a highly pressurized oxygen delignification reactor. The oxygen dissolves into the water phase of the wood pulp and reacts with the lignin in the wood pulp. In order to accelerate the dissolution of the oxygen, one or more transducers as described heretofore may be employed.

The transducer(s) may be disposed in the wood pulp slurry, possibly on the inside wall proximate to the inlet port of the oxygen delignification reactor, to maximize the exposure of the wood pulp slurry to the effect of the transducer during its residence time in the reactor. The typical residence time of 30-120 minutes of the wood pulp slurry in the reactor is adequate for the transducer to help accelerate the transfer of oxygen from the gas bubbles into the water in the wood pulp. Based on experimental data, a transducer properly tuned to accelerate the gas transfer rate across the gas/water interface in water has been demonstrated to achieve a rate 20-40% higher than that in the untreated reference case. The net effect is an increase in the processing capacity of the oxygen delignification reactor or a reduction in the operating pressure necessary to achieve the desirable rate of oxygen transfer from the gas bubbles into the water of the wood pulp during its transit through the reactor. High capital cost is a major disadvantage of the conventional oxygen delignification process. The transducer with the appropriate signal will significantly reduce the capital cost and/or reaction time of the oxygen delignification process.

Accordingly, one aspect of this disclosure suggests a method of oxygen delignification of wood pulp, comprising: providing oxygen to wood pulp; providing a transducer in or about the pulp slurry, and applying an alternating electrical current to the transducer so as to produce an alternating magnetic field, wherein the alternating electrical current has a frequency and an amplitude such that the alternating magnetic field has an effect on the water within the pulp slurry providing an at least 5% increase in the gas exchange rate at a distance of at least 1 meter from the first transducer; and providing the pulp mixed with the oxygen and affected by the alternating magnetic field to a delignification reactor. Preferably, the transducer is disposed on the inside wall near the inlet port within the delignification reactor.

There are many heterogeneous chemical reactions in which the rate of transfer of the applicable chemicals from the gas phase into the polar liquid is the reaction rate limiting step. By placing one or more transducers with the appropriately tuned frequency, amplitude and phases on a wall of the reactor or the stock tank of the polar liquid to modify a property of the polar liquid to accelerate the interfacial gas transfer across the gas/liquid interface of usually the dispersed gas bubbles in the polar liquid, a more efficient and cost effective chemical reaction process can be achieved. The transducer may be disposed inside the vessel, e.g. on the inside surface of the wall, or on the outside surface of the wall, which then should be magnetically transparent, e.g. having a magnetically transparent window. The wall is understood as a side wall, a bottom, or a top cover.

Figure 10:
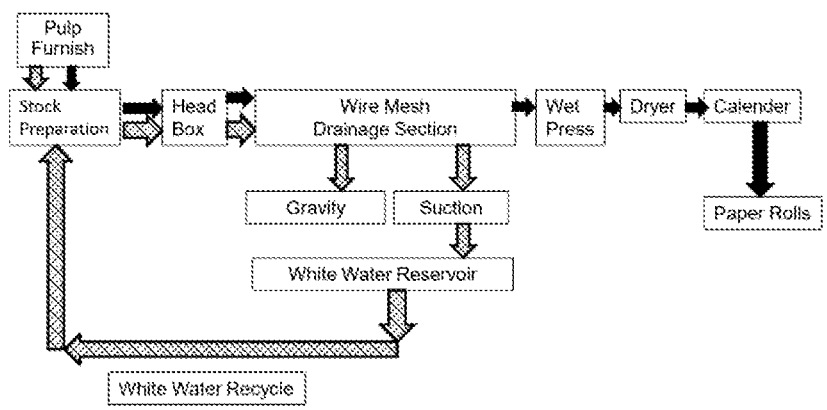
FIG. 10 is a schematic diagram of a paper machine

Another embodiment of this disclosure relates to using the transducer described heretofore to lessen the drying time in an industrial process. FIG. 10 is a schematic diagram of a typical paper machine deploying the twin-wired Fourdrinier forming process. The pulp furnish slurry in a water mixture consisting of 99.3-99.9% water is produced at the Stock Preparation Section by mixing the incoming pulp furnish with the White Water recycled from the White Water Reservoir (Wire Pit) under the twin-wired drainage section (Wet End or Forming Section) of the paper machine. The White Water is the process water drained from the pulp slurry through gravity in the front portion and by suction in the back portion of the Forming Section. The paper sheet is then pressed against a belt of felt on rolls to transfer the water from the paper sheet to the felt in the Wet Press Section. In the subsequent Drying Section, the paper sheet is heated with steam through a set of rolls to remove the water through evaporation. The paper sheet is then pressed by a set of calendering rolls to achieve the desired thickness and surface smoothness. The production capacity of a Fourdrinier paper machine is limited by the water drainage rate at the Wet End, the rate of flow of the water from the paper sheet to the felt in the Wet Press Section and the rate of vaporization of the water in the Drying Section. The modified characteristics (reduced water viscosity) of the magnetically treated water permit a much more rapid drainage of the water from the pulp slurry which is fed by gravity from the Headbox through a Slice at or about a consistency of 0.1-0.4% solids onto the rapidly moving (200-2,500 m/min) wire mesh of the Forming Section of the paper machine. The sheet consistency would be approximately 25% solids when the sheet exits the Forming Section and enter the Wet Press Section from which the sheet will exit at a consistency of approximately 40-55% solids. The paper sheet will exit the subsequent Drying Section with a moisture content of approximately 2-12%. The higher equilibrium partial vapor pressure of the magnetically treated water in the sheet may permit a more rapid drying rate with lower energy consumption.

In one embodiment, one or more transducers with aligned frequency, phase and amplitude as described heretofore, are placed in the White Water Wire Pit on the walls and away from the exit port leading to the suction port of a fan pump which circulates the White Water back to the Forming Section of the paper machine. One or more transducers with aligned frequency, phase and amplitude may be placed away from the respective exit ports of the Whitewater Chest (not shown) and/or the Headbox to provide maximum exposure of the specific magnetic field to the White Water and the pulp slurry being circulated at the Forming Section. It is preferable that all the transducers are synchronized to produce electrical signals alternating with the same frequency, phase and amplitude. It is preferable that the respective frequency, phase and amplitude of the different sets of transducers in this process are substantially aligned. Minor misalignments may diminish the targeted treatment impacts on the process.

Through operational optimization, the number of transducers may be increased or decreased to achieve the most desirable cost effectiveness.

In another embodiment, the transducer may be placed through the piping elbows in the Forming Section as a replacement or in addition to the transducer placements in the tanks. In one embodiment, if more than one transducer is placed inside a tank, the transducers are disposed on opposite walls or corners of the tank.

Depending on the specific configurations of a paper machine, the production capacity increase with magnetic field treatment of the White Water in the Forming Section and the paper sheet in the subsequent processing sections is expected to be approximately 5-30%.

The flow rates of different drying operations span a wide range, from paper making at the high end to pharmaceuticals at the low end. The liquid phase may include but is not limited to water, alcohols and many different polar and non-polar solvents. The final product may include sheets of paper, boards, pulps, plastics, automotive coatings, etc., amorphous particles or powder; grains, corn, diced vegetables; strings, e.g. noodles; etc. All of these require drying in their manufacture.

Furthermore, in accordance with the method disclosed herein, multiple transducers with a combination of frequency, phase, amplitude and separation distance may be placed so as to achieve changes of a property of a polar liquid without the addition of chemicals.

The polar liquid may form a river, lake, pond, lagoon, or other body of water. Applying the alternating electrical current to the transducer may result in an increase in dissolved oxygen or other dissolved gasses within the polar liquid. Diatoms may be added to the polar liquid before, after or concurrently with energizing the transducer, so as to lessen cyanobacteria, algal blooms, ammonia, phosphates or total nitrogen in the polar liquid over time.

A polar liquid treated by the transducer(s) may be used for aquaculture, in particular, for growing aquatic animals, such as fish or shrimp. Optionally, diatoms, oxygen, and/or air may be added to the polar liquid. We believe that the method disclosed herein is beneficial in fish and/or shrimp farming. Typically shrimp farming is done in large ponds and these ponds often need mechanical aerators to maintain minimally acceptable dissolved oxygen concentration of 3 mg/l in the water at night and need to be dredged or evacuated after a period of time due to fish/shrimp waste settling on the bottom of these ponds.

An aspect of this disclosure relates to fish and shrimp farming. The biochemical process of digesting fish wastes in-situ is not that different from that for human sewage. Nevertheless, fish waste is often characterized by the ingredients in the fish feed. Any undesirable contaminants in the fish feed, e.g. heavy metals, inorganic chemicals, will show up in the fish wastes. Obtaining information related to the inorganic chemicals, including heavy metals, chlorides and sulfates, in the fish feed and the fish wastes to ensure that the in-situ waste digestion process would not become a pathway for the accumulation of inorganic chemicals, especially heavy metals, in the water in the fish pond can be useful.

The assertion that fish would feed on fish waste is scientifically dubious, especially if fish feed pellets are available. The observation may be confusion with the fish trying to retrieve fish feed pellets buried under the accumulated fish wastes. Consequently, the growth of the fish will be inhibited if a large portion of the fish feed, especially those in pellet form, is buried under a thickening blanket of fish waste.

Ammonia, if allowed to accumulate from the continuing discharge of the fish wastes, at higher concentration will reduce the health resilience of the fish population. Using our transducer with a signal of the appropriate frequency and amplitude may help to increase the dissolved oxygen (DO) in the water not only for the fish or shrimp but also for the aerobic bacteria that will digest the fish or shrimp wastes. The elevated oxidation-reduction potential (ORP) and the growing presence of the aerobic nitrification bacteria, will drive the chemical equilibrium in the water from ammonia to nitrates which will encourage the growth of phytoplanktons and zooplanktons, both of which are desirable food for the fish population. The declining ratio of fish feed to fish growth weight may be an additional benefit in the deployment of the transducers in fish ponds. The most productive water in the fish pond is not water with high clarity. A slightly brown or greenish water populated with phytoplanktons and zooplanktons is more healthy and beneficial for the growth of fish and shrimps.

We believe that that fish will grow faster in the presence of our energized transducer. However, the pH and the concentrations of inorganic chemicals in the water may be monitored regularly to avoid an elevated concentration of dissolved solids, e.g. sulfates and chlorides, originated from the fish feed. If the "total dissolved solids" in the water is observed to continue to rise during the in-situ digestion of the fish wastes in the presence of the energized transducer, a program of regularly bleeding a small portion of the water and replacing it with fresh sterilized water would need to be instituted to maintain a healthy growth environment for the fish population. The amount of water bleed will be determined by the rate of chemicals accumulation in the water. Preferably, the water being replenished would be sterilized using ultraviolet or hydrogen peroxide. Chlorinated chemicals for water sterilization should be avoided to minimize the introduction of chlorinated organics into the water.

An alternative to bleeding the pond water regularly, especially if heavy metal contamination is an on-going concern, selected aquatic plants could be planted along the shoreline of the fish pond to remove the heavy metal and accumulated inorganic chemicals through the absorption by and growth of the aquatic plants. These aquatic "forest" would provide a spawning ground for some species of fish.

If the fish species being raised require a continuing supply of live feed fish, the quality of the supply chain should be rigorously monitored to avoid the inadvertent introduction of disease and chemicals from a contaminated feed fish stock.

The benefit of using our transducer is multifold. There is an increase in oxygenation of the water due to the gas mass transfer rate across the air water barrier which assists in fish/shrimp growth, and there is less requirement for draining and cleaning these fish/shrimp ponds.

In the presence of high DO in the water, the in-situ digestion of the fish or shrimp waste by aerobic bacteria would increase the concentration of oxidation chemical species, e.g. nitrates, and raise the ORP of the water which will inhibit the presence and activity of many typical species of pathogens and viruses problematic in aquaculture operations.

The method in accordance with this invention has several other advantages. By way of example, by maintaining a dissolved oxygen concentration of at least 1 mg/l and preferably above 3-4 mg/l in the water immediately above the sludge at the bottom of the applicable water body without the use of mechanical aerators or the addition of oxidizing chemicals into the applicable water body we can suppress the formation of organometallic compounds in and/or their release into a water body from sediments and or banks contaminated with heavy metal.

In another aspect our method can be used to minimize arsenic contamination in rice by suppressing the release of arsenic from soil particles under oxidation-reduction potentials of +150 mV or higher in the water-saturated soil without the use of mechanical aerators in the water in the applicable rice fields, or suppress arsenic contamination of water bodies, including ponds, lakes, rivers, estuaries and ground water by maintaining an oxidation-reduction potential above +150 mV or higher throughout the water body without the use of mechanical aerators in the applicable water body.

One aspect of this disclosure relates to using one or more PCD devices with transducers at least partially immersed in a body of water which is at least 15 feet in length, wherein the transducers each comprises an electrically conductive solenoidal coil and an alternating electrical signal is applied to the coil so as to produce an alternating magnetic field about the coil, wherein the alternating electrical current has such a frequency and power so that the alternating electrical signal produces a resulting magnetic flux in the water, wastewater, sewage or sludge which causes water molecules adjacent to the transducer influenced by the alternating magnetic flux to influence other more distant water molecules causing a chain reaction at least 3 feet from the transducer, wherein alternating frequency and magnetic flux density cause an elevated dissolved oxygen (DO) concentration of 3 mg/l or higher and ORP of the water to be at least 150 my, to reduce the methylation of a heavy metal such as mercury by anaerobic bacteria in the sludge, and reduce the corresponding heavy metal (e.g. mercury) contamination in proximity to the devices by at least 20%, preferably by 80%. High reduction values, such as 95%, and even 99% may be reached over several months of applying the signal.

Another aspect of this disclosure relates to using one or more PCD devices with transducers at least partially immersed in a body of water which is at least 15 feet in length, wherein the transducers each comprises an electrically conductive solenoidal coil and an alternating electrical signal is applied to the coil so as to produce an alternating magnetic field about the coil, wherein the alternating electrical current has such a frequency and power so that the alternating electrical signal produces a resulting magnetic flux in the water, wastewater, sewage or sludge which causes water molecules adjacent to the transducer influenced by the alternating magnetic flux to influence other more distant water molecules causing a chain reaction at least 3 feet from the transducer, wherein alternating frequency and magnetic flux density cause ORP of the water to be at least 100 mV and preferably 150 mV or higher in proximity to the devices within 1-2 months of applying the signal so as to reduce arsenic contamination in the body of water and prevent arsenic contamination of rice growing in the body of water.

In one embodiment, the PCD devices are used for treating a body of water of sewage, wherein the polar liquid has added diatoms. Results of treatment may include reduction of undesired pathogens, enhanced aerobic microbe population, digestion of suspended solids and sludge, displacement of anaerobic microbes and the attendant foul odors, etc. The body of water may be a lake, a river, an industrial lagoon, or an ocean. Oxygen or air may be added to the polar liquid before or concurrently with energizing the transducer. The oxygen or air is provided in the form of bubbles or by mechanical agitation of the polar liquid. Alternatively or complementary to the addition of oxygen or air, diatoms may be added to the polar liquid. Our treatment enhances the ability of the water to absorb gases in bubbles. The method could include the use of the transducer described herein and a bubbler or aerator to enhance oxygen absorption. Also, by treating the water with the transducer, gases which naturally bubble up from the bottom may be more readily absorbed into the water and consumed by the community of living organisms in the water.

In one embodiment, the PCD device is used for pretreatment of a polar liquid before drip irrigation, or aquaculture. The drip irrigation may be assisted by the method disclosed herein, and include the elimination of clogging by pretreatment of the water through various mechanisms; settlement of debris, digestion of debris, maturing the biological matter (wet composting) so that they do not grow in the drip irrigation system. Additionally, pathogens may be eliminated by aerobic processing of the water, and the agronomic value of the liquid may increase by changing the nutrients within the liquid and making them more readily available.

The transducer described heretofore, energized with an alternating current of a preferred frequency and amplitude, can change the property of a body of water, such that the water after treatment has commercial advantages, at a fraction of the cost and energy, over most other systems that attempt to clean or filter a same body of water. In our system, the water itself is not simply filtered removing unwanted matter there within. In contrast, our transducer in operation may convert harmful bacteria and harmful algae into "liquid compost", leaving micronutrients in the water. After treating the body of water, it can be pumped or allowed to flow through a manifold/conduits to irrigation systems, most importantly drip irrigation systems. This may lessen or eliminate clogging by pretreatment of the water through various mechanisms with our device and allow settlement of debris, digestion of debris, maturing the biological matter (wet composting) so that heavy particle composted matter does not flow into the drip irrigation system. Due to the aerobic enhancement that may occur using our transducer, pathogens are suppressed via aerobic processing that occurs.

By using our transducer, the higher gas exchange rate will ensure a high level of dissolved oxygen (DO) in the water. The high DO will suppress the growth of pathogens, most of which are anaerobic species, e.g. *E-coli, Salmonella*, etc., in the water. We believe that the alternating magnetic field provided by the method disclosed therein has an effect of reducing a concentration of phosphates, farm fertilizer runoffs, suspended solids, facultative bacteria, coliform, algae, zooplanktons, pests, *Daphnia*, or mosquito larvae.

The high DO and the high oxidation reduction potential (ORP) will encourage the chelation of metals in solution, including iron and phosphates, and render them less available for the growth of bacteria, phytoplanktons and zooplanktons in the water in the irrigation tubes. We believe that the lower water surface tension, if effected, will make it more difficult for particles, living or otherwise, to attach to the inner surface of the irrigation tubes, and the lower water viscosity, if effected, will accelerate the settling of suspended particles, living or otherwise, in the bulk water in the reservoir, resulting in a lower concentration of suspended solids in the water being distributed through the irrigation tubes. The higher DO in the water distributed through the irrigation tubes will help to invigorate the microbial communities in the soil. These conditions will stimulate the nitrification process and the wet composting of organic matters in the soil. More healthy growth of plant root systems will result.

Another advantage of using our transducer as a pretreatment of water before allowing that water to flow through a drip irrigation system is not just that clogging of the drip irrigators is lessened or avoided, but another advantage is realized in the availability of processed liquid composting by harvesting the settled rich compost at the bottom of a lake, lagoon or containment vessel.

In other words, drip irrigation systems, or aquaculture systems may use polar liquid pre-treated using the following method. A transducer comprising an electrically conductive solenoidal coil is disposed at least partially within the polar liquid, wherein the coil is formed of a plurality of loops each having an interior, the loop interiors forming an interior of the coil, wherein the polar liquid is substantially prevented from penetrating the interior of the coil of transducer, or a portion of the alternating magnetic field external to the coil is prevented from penetrating the polar liquid when the transducer is at least partially immersed therein. An alternating electrical current is applied to the coil so as to produce an alternating magnetic field about the coil, wherein a portion of the alternating magnetic field penetrates the polar liquid and the alternating electrical current has a frequency and a amplitude such that the alternating magnetic field has an effect on the polar liquid which changes a property of the polar liquid at a distance of at least 1 meter from the transducer. The property may be gas exchange rate, surface tension, viscosity, freezing point, or partial vapor pressure. The treated liquid is then provided, or allowed to flow, though pipes or conduits into a drip irrigation system, or an aquaculture system. The pretreatment may be performed to a liquid which forms part of a river, an ocean, a lake, a pond, or an industrial lagoon. The liquid may be water, sludge, or sewage.

Advantageously, the method disclosed herein may be practiced in open bodies of water, or sewage, or other liquids, including lakes, lagoons, rivers, channels, ponds and oceans. Industrial applications include columns, tanks, reactors, scrubbers, industrial ponds and pipelines.

By being able to increase and control the amount of dissolved oxygen with a simple feedback loop we can increase, measure and hold the dissolved oxygen level by controlling our device in an on-off-on-off state to a desired level. This allows us to increase the processing efficiencies of waste water treatment facilities in pulp and paper production by maintaining a dissolved oxygen concentration above 0.5 mg/l and preferably at least 1-3 mg/l throughout the water without the use of mechanical aerators or the addition of oxidizing chemicals into the applicable water body.

Its use is not limited to freshwater as it can treat waste water in tailings ponds of mining operations, in the presence of oxidizing chemical species, e.g. nitrates, by maintaining a high dissolved oxygen concentration and an ORP of +400 mV or higher throughout the water body without the use of mechanical aerators in the applicable water body.

Increasing the dissolved oxygen in a water body can assist in the destruction of cyanides and cyanates in waste water and gold mining effluents with a first stage lagoon. This is done by maintaining an oxidation-reduction potentials of +400 mV in the water at a pH of 10 for a minimum average residence time of 5 hours and preferably more than 10 hours and a second stage lagoon by maintaining an ORP of +600 mV and preferably +650 to +800 mV in the water at a pH of 8.5 for an average residence time of at least 5 hours and preferably more than 10 hours, without the use of mechanical aerators in the applicable water body.

Foul odor emission can be lessened or eliminated in water bodies deficient in dissolved oxygen by maintaining a dissolved oxygen concentration of at least 0.5 mg/l and preferably more than 2 mg/l in the water immediately above the sediments at the bottom of the applicable water body without the use of mechanical aerators or the addition of oxidizing chemicals into the applicable water body.

Production of an organic fertilizer substantially free of facultative microorganisms from the sludge resulted from the aerobic digestion of organic wastes (sewage) generated by, human and animals is produced by maintaining an ORP of at least +300 mV and preferably above +450 mV in the water immediately above the sediments at the bottom of the treatment lagoon for a period of at least 3 days and preferably more than 6 days for a sediment thickness of 3 cm and correspondingly longer periods for sediments of larger thickness without the use of mechanical aerators or the addition of oxidizing chemicals into the applicable water body.

Furthermore, we can reduce or eliminate deficiency of dissolved oxygen in anoxic water bodies including but not limited to "dead zones", oxygen deficient zones or oxygen minimum zones in oceans, estuaries, bays, lakes and rivers without the use of mechanical aerators or the addition of oxidizing chemicals into the water body.

Another significant advantage to our method, is that it can with very little power in a relatively short amount of time, suppress algae blooms in water bodies, including but not limited to those of blue-green algae (Cyanobacteria) and red tides (toxins generating aquatic organisms, such as *Gonyaulax, Gymnodinium, Karenia, Dinophysis*, etc.) by promoting the growth of the aerobic community with consistently high dissolved oxygen concentration and reduce the availability of growth nutrients in the top first few meters of the water body without the use of mechanical aerators or the addition of oxidizing chemicals into the applicable water body.

We believe that ubiquitous use of the PCD described herein above can have a positive effect assisting in the reversal of climate change through the suppression of the emission of methane and nitrous oxide in anoxic zones and the improvement of bio-productivity of the surface layer of the ocean to provide a globally impactful sink for carbon dioxide in the atmosphere. By deploying our transducer on the water surface over a specific water column in an anoxic zone in a water body, including but not limited to oceans, bays, rivers, estuaries and lakes, the water surface within 50 to 150 m of the device would remain substantially saturated with dissolved oxygen (DO) 24 hours everyday. The higher DO and the presence of the transducer would accelerate the growth of the aerobic microbial community in the top 100 m of the water column. Subject to adequate convective mass transfer between the top and bottom of the water column, the higher DO at the top of the water column may eliminate or compress the anoxic zone further down towards the floor of the water body.

The result would be a lower rate of emission of methane and nitrous oxide from the anoxic zone. Other than as a by-product of ammonium oxidation, the formation of nitrous oxide by the microbial community is usually suppressed under aerobic conditions. Similarly, the formation of methane in the sludge at the bottom of the water body will also be suppressed under aerobic conditions and enhanced activity of methanotrophs in the water body. As the bubbles, if any, of methane rise through the water column, they will initiate convective mass transfer between the top and bottom of the water column. The convective mass transfer will also be augmented by wind and tidal movements and the activities of the fish and other aquatic animals attracted to the increasing population of phytoplanktons and zooplanktons in the water column, characterized by the higher DO and a thriving microbial community. If our operating transducer successfully compresses the anoxic zone, the rising bubbles, if any, of methane will also be transiting through a thicker water column with higher DO, ORP, a higher interfacial gas exchange rate and a thriving aerobic microbial community. There may be a larger transition zone between the anoxic layer and the rest of the water body. Previous studies have shown that a substantial proportion of the bio-oxidation of the methane was effected by the methanotrophs in this transition zone.

With the suppression, if effected, of nitrous oxide formation in the anoxic zone and the higher DO and thriving aerobic microbial community in the top 50-100 m of the water column, the net emission of methane and nitrous oxide from the ODZ (Oxygen Deficient Zone) in the water body to the atmosphere above the water column may be reduced or eliminated.

The growing presence of fish and other aquatic species in a high DO environment will improve the biological productivity of the water column without inducing a deficiency of DO. When photosynthesis by the algae generates supersaturated DO in the water under the sun, our device would accelerate the release of the dissolved oxygen from the water into the air and maintain a lower level of oxygen supersaturation in the water. This lower level of oxygen supersaturation under our treatment would be a lower drag or resistance for the photosynthetic reaction and help to maintain the photosynthesis kinetics and growth of the algae at the top surface layer of the water. Using our transducer by providing a suitable operational flux density and frequency would increase the photosynthesis throughout the top surface layer of the water body under the sun and increase the capacities for oxygen generation and carbon dioxide transfer from the atmosphere into and consumption by a water body, including the oceans. By deploying many of our devices we believe that our invention will assist to reverse the direction of climate change by the accelerated conversion of atmospheric carbon dioxide into oxygen through the accelerated photosynthesis in the oceans. The distribution of a large number of our PCD around the oceans may be accomplished through the deployment of our PCD as an accessory to the 30,000 cargo vessels currently plying the oceans and visiting ports globally. Our PCD can also be deployed on existing buoys in the coastal regions and navigations channels around the world.

The accelerated removal of the dissolved carbon dioxide that results from the growth of aquatic species will reduce the acidity of the bulk water beneath the water surface. The improved productivity in the surface layer of the water body will accelerate the combination of atmospheric carbon dioxide with nutrients in the water body to produce a higher population growth of fish and other aquatic species.

Accordingly, this disclosure provides a method of treating a body of water, including water, wastewater, sewage, or sludge to increase the amount of dissolved oxygen therein, comprising: providing a device adjacent to the polar liquid or at least partially immersed therein, the device having a signal generator housed therein; and having a submersible transducer at least partially immersed in the body of water and electrically coupled to the signal generator; and, operating the signal generator to provide an alternating electrical signal to the submersible transducer, wherein the alternating electrical signal is of a frequency and intensity to affect the transducer to produce a resulting alternating magnetic field having a magnetic flux density so as to provide an increase in the gas exchange rate by at least 5% at a distance of at least 1 meter from the submersible transducer.

The method disclosed herein may be applied in chemicals manufacturing and mineral beneficiation, resulting in accelerated absorption or desorption of gaseous chemicals into or from aqueous solutions in the manufacture of chemicals including but not limited to sulphuric acid, hydrochloric acid, hydrogen peroxide, ammonium nitrate, sodium cyanide, etc. and the treatment of water using gaseous disinfectants including but not limited to chlorine, chlorine dioxide, ozone, etc. in reaction vessel.

An appropriately tuned transducer may be disposed on the wall of a stock tank of water or aqueous chemical solution near the inlet of the tank to maximize the exposure time of the water or aqueous chemical solution to the transducer so that the treated water or aqueous chemical solution will experience an accelerated transfer rate of the target chemicals in the gas phase into the liquid phase in the subsequent scrubber or absorption column. A residence time of 15-60 minutes in the stock tank will be adequate for this treatment process. If the aqueous chemical solution is highly corrosive, the transducer can be placed on the wall outside the tank and transmit its magnetic flux through a magnetic field transparent window of glass, plastics, ceramics or similar material. This configuration will significantly improve the process efficiency in the manufacture of the chemicals listed above where the target chemical in the gas phase needs to be absorbed by the liquid phase in a scrubber, absorption column with or without applicable packings.

The method disclosed herein may be applied in gas extraction or purification including carbon capture, resulting in accelerated absorption and desorption of gases in aqueous chemical solutions in absorption and desorption vessels respectively for the extraction or purification of gases, including but not limited to oxygen, carbon dioxide, sulphur oxides, nitrogen oxides, etc.

Figure 9:
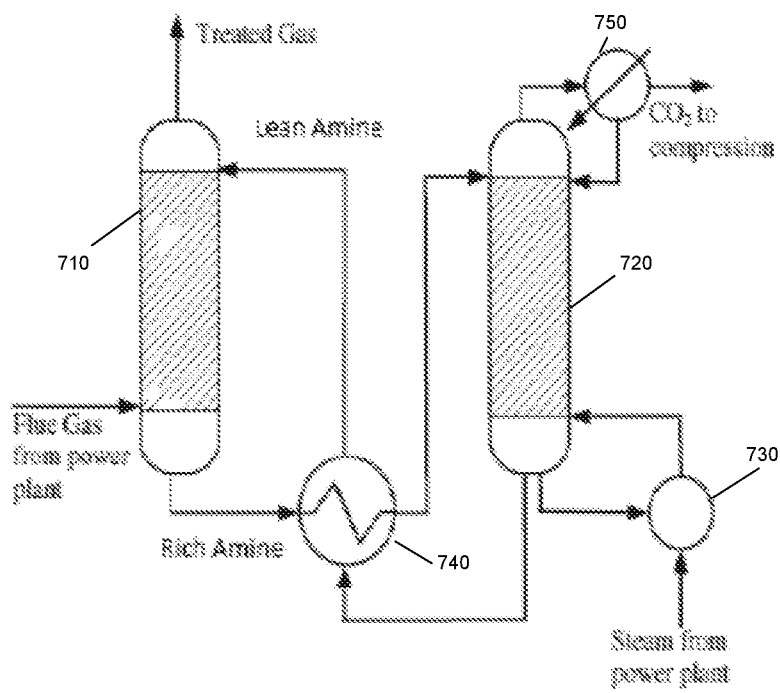
FIG. 9 is a flow diagram for a carbon dioxide extraction process.

In carbon capture processes, the currently most competitive process is the use of amine aqueous solutions to absorb the carbon dioxide in the gas phase in the absorption column and release the carbon dioxide by heating the solution in the subsequent desorption column. The rate of transfer of carbon dioxide from the gas phase to the amine aqueous solution (lean amine solution) is a rate limiting step in the absorption column. The rate of transfer of the carbon dioxide from the heated amine aqueous solution (rich amine solution) into the gas phase is a rate limiting step in the desorption column. FIG. 9 shows a simplified flow diagram of a typical carbon dioxide extraction process using aqueous amine solutions. The system includes an absorber 710, a stripper 720 also referred to as a desorption column 720, a reboiler 730, a cross heat exchanger 740, and a condenser 750. Both the absorption column 710 and the desorption column 720 are usually filled with packing which provide extensive surface area for the aqueous amine solution to be in contact with the counter-flowing gas to improve the rate of interfacial mass transfer.

A transducer with a suitable electrical signal provided thereto may be immersed in the rich aqueous amine solution on the wall of the vessel at the bottom of the absorption column 710 to accelerate the transfer of carbon dioxide from the liquid phase into the gas phase in the desorption column 720. Depending on the process configuration of the installation, another suitably tuned transducer may be placed near the inlet port on the wall of the reboiler at the bottom of or immediately after the desorption column to accelerate the transfer of carbon dioxide from the liquid phase into the gas phase in the reboiler 730. With reference to FIG. 9, another suitably tuned transducer may be placed near the inlet port on the wall of a lean amine solution stock tank (not shown) feeding the distribution nozzles at the top of the absorption column 710 to accelerate the rate of transfer of carbon dioxide in the up-flowing gas phase into the down-flowing lean aqueous amine solution on the surface of the packing in the absorption column 710. The average residence time of the lean aqueous amine solution in the stock tank should be 15-60 minutes.

Based on experimental data on the impact of the transducer on the rate of interfacial mass transfer in water, the carbon dioxide capture rate in an existing amine solution carbon dioxide capture installation with the transducers is expected to be 50-400% higher than that without the transducers.

This technology will significantly reduce the capital and operating costs of carbon dioxide capture using aqueous chemical solutions and provide a meaningful contribution to the control of greenhouse gases in the atmosphere.

The method disclosed herein may be applied in manufacturing of fine chemicals, food products, nutraceuticals and pharmaceuticals, for specific surface tension control of the aqueous solution in crystallization processes to control the size range and size distribution of crystals in the product.

Specific interfacial tension control of the aqueous solution in crystallization processes may be used to control the shape, size range and size distribution of crystals in the product. The taste of ice cream is critically dependent on the shape, size range and distribution of the ice crystals in the ice cream. The speed of dissolution of pharmaceuticals or nutraceuticals in water or in the human digestive system is controlled by the size range and distribution of the pharmaceutical or nutraceutical crystals.

Interfacial tension is a major controlling factor in the crystallization process. It controls the energy required to move a molecule in the bulk solution onto the surface of the solid surface of the growing crystal. By placing a suitably tuned transducer immersed in the aqueous solution near the entry port on the interior wall of the crystallizer reactor to increase or decrease the surface tension of the aqueous solution, its impacts on the interfacial tension between the bulk liquid and the solid surface of the crystal will permit the growth rate of the crystals to be adjusted. By placing a second suitably tuned transducer with slightly different frequency or phase to those of the first one on the inside wall of the crystallizer 1 m from the first transducer, its activation in conjunction with the first transducer may promptly reverse the initial surface tension adjustment of the aqueous solution. The resulting impact on the interfacial tension between the bulk liquid and the crystal solid surface may stop further growth of the crystals. The range and precision of such interfacial tension control will permit the control of the range and/or size distribution of the crystals being produced without the addition of any other chemicals which may introduce contamination and/or other undesirable effects on the final product.

The invention claimed is:

1. A method of changing a property of a polar liquid, comprising: providing a first device adjacent to or at least partially immersed in the polar liquid, the first device comprising a first signal generator and a first transducer electrically coupled thereto; and, operating the first signal generator to provide a first alternating electrical signal to the first transducer, wherein the first alternating electrical signal is of a first frequency and a first amplitude to affect the first transducer to produce a resulting alternating magnetic field having a magnetic flux density so as to change the property of the polar liquid, wherein a portion of the alternating magnetic field penetrates the polar liquid, having an effect on the polar liquid and providing a change in the property of the polar liquid at a distance of at least 1 meter from the first transducer, wherein the property is a gas exchange rate and the change is at least 5%, or the property is surface tension and the change is at least 1%, or the property is viscosity and the change is at least 0.5%.

2. A method as defined in claim 1, wherein the first transducer comprises a first electrically conductive solenoidal coil formed of a plurality of loops each having an interior, the loop interiors forming an interior of the first electrically conductive solenoidal coil, wherein the polar liquid is substantially prevented from penetrating the interior of the first electrically conductive solenoidal coil.

3. A method as defined in claim 1, wherein the first device is at least partially immersed in the polar liquid.

4. A method as defined in claim 3, wherein the first transducer comprises two ferromagnetic end pieces disposed at the ends of the first electrically conductive solenoidal coil and transverse thereto for shaping the magnetic field.

5. A method as defined in claim 4, wherein the first transducer comprises a ferromagnetic core within the interior of the first electrically conductive solenoidal coil for increasing the magnetic flux density of the transducer.

6. A method as defined in claim 4, wherein each of the end pieces has a radius of at least an outer radius of the first electrically conductive solenoidal coil plus a radius of the ferromagnetic core.

7. A method as defined in claim 4, wherein the end pieces are planar and normal to the first electrically conductive solenoidal coil.

8. A method as defined in claim 2, wherein the first transducer is disposed inside of a vessel or on an outside surface of a magnetically transparent wall of a vessel, for accelerating drying of a pharmaceutical, nutraceutical, or food product or a coating or pulp and paper.

9. A method as defined in claim 3, wherein the first amplitude has a root mean square (rms) of 100±15 microAmperes and the first frequency is 2500±10 Hz, or the first amplitude has an rms of 99±15 microAmperes and the first 2700±10 Hz, or the first amplitude has an rms of 140±15 microAmperes and the first 4000±10 Hz.

10. A method as defined in claim 1, comprising using the first device and a second device comprising a second transducer and a second signal generator for providing a second alternating electrical signal to the second transducer.

11. A method as defined in claim 10, wherein a frequency of the second alternating electrical signal is equal to the first frequency and wherein the first and second alternating electrical signals are in phase, having a zero degree phase relationship for increasing the change in the polar liquid.

12. A method as defined in claim 10, wherein a frequency of the second alternating electrical signal is different from the first frequency for changing the property of the polar liquid oppositely, with respect to a baseline of the property when the liquid has not been treated by a magnetic field, to the change caused by the first transducer alone.

13. A method as defined in claim 12, comprising a gradual change (A) in a difference between the first frequency and the frequency of the second alternating electrical signal, or (B) in an offset in phase between the first and second alternating electrical signals, for controlling the effect on the polar liquid.

14. A method as defined in claim 1, wherein the first transducer comprises: an electrically conductive solenoidal coil for coupling to the signal generator, the electrically conductive solenoidal coil formed of a plurality of loops each having an interior, the loop interiors forming an interior of the electrically conductive solenoidal coil, wherein the interior of the electrically conductive solenoidal coil has a channel for the polar liquid to pass through when the first transducer is immersed in the polar liquid, and a ferromagnetic cladding around the electrically conductive solenoidal coil and electrically isolated therefrom, for preventing a portion of the alternating magnetic field external to the electrically conductive solenoidal coil from penetrating the polar liquid when the first transducer is immersed in the polar liquid and operational.

15. A method as defined in claim 2, wherein a power of the first alternating electrical signal provided to the first transducer is less than 1 watt or a root mean square of the first amplitude is less than 3 amperes.

16. A method as defined in claim 2, wherein an electric field produced by the first transducer in response to the first alternating electrical signal and penetrating the polar liquid has the intensity of less than 1 V/m.

17. A method as defined in claim 2, wherein the first frequency of the first alternating electrical signal is 20 kHz or less.

18. A method as defined in claim 2, wherein a feedback loop is provided to control the first alternating electrical signal in dependence upon a measured parameter.

19. A method as defined in claim 18, comprising selection of the first frequency from a plurality of predefined frequencies.

20. A method of changing a property of a polar liquid, comprising: providing a first device adjacent to the polar liquid or at least partially immersed therein, the first device comprising a first signal generator and a first transducer electrically coupled thereto; and, operating the first signal generator to provide a first alternating electrical signal to the first transducer, wherein the first alternating electrical signal is of a first frequency and a first amplitude to affect the first transducer to produce a resulting alternating magnetic field having a magnetic flux density so as to change the property of the polar liquid, wherein a portion of the alternating magnetic field penetrates the polar liquid, having an effect on the polar liquid and providing a change in the property of the polar liquid at a distance of at least 1 meter from the first transducer, wherein the property is a gas exchange rate and the change is at least 5%.

21. A method as defined in claim 20, wherein the first transducer comprises a first electrically conductive solenoidal coil formed of a plurality of loops each having an interior, the loop interiors forming an interior of the first electrically conductive solenoidal coil, wherein the polar liquid is substantially prevented from penetrating the interior of the first electrically conductive solenoidal coil.

22. A method as defined in claim 21, wherein two ferromagnetic end pieces disposed at the ends of the first electrically conductive solenoidal coil and transverse thereto for shaping the magnetic field, and wherein the first amplitude has a root mean square (rms) of 100±15 microAmperes and the first frequency is 2500±10 Hz, or the first amplitude has an rms of 99±15 microAmperes and the first 2700±10 Hz, or the first amplitude has an rms of 140±15 microAmperes and the first 4000±10 Hz.

23. A method as defined in claim 20, wherein the polar liquid forms a portion of a river, lake, pond or lagoon or other body of water, and wherein applying the first alternating electrical current to the first transducer results in an increase in dissolved oxygen or other dissolved gasses within the polar liquid.

24. A method as defined in claim 23, wherein an amount of residual ammonia in the body of water body is reduced, or algae bloom or pest infestation in the body of water is suppressed.

25. A method as defined in claim 23, wherein the first frequency and the magnetic flux density are such as to cause ORP of the polar liquid to be at least 150 mV.

26. A method as defined in claim 25, wherein the first frequency and the magnetic flux density are such as to reduce heavy metal contamination in proximity to the first device by at least 20%.

27. A method as defined in claim 13, wherein the polar liquid is an aqueous solution in the manufacturing of a pharmaceutical, nutraceutical, or food product or a chemical, for crystal size or size distribution range control.

28. A method as defined in claim 20, wherein the first transducer is disposed inside of a vessel or on an outside surface of a magnetically transparent wall of the vessel comprising a chemical solution or dispersion, so that a multi-phase chemical reaction in the polar liquid is accelerated by the change in the gas exchange rate.

29. A method as defined in claim 28, for accelerated removal of carbon dioxide in a gas through absorption and desorption in the polar liquid.

\* \* \* \* \*